(12) United States Patent
Masaki et al.

(10) Patent No.: US 6,656,049 B1
(45) Date of Patent: Dec. 2, 2003

(54) ELECTRONIC GAME APPARATUS

(75) Inventors: Namiko Masaki, Tokyo (JP); Fujio Nobata, Tokyo (JP); Madoka Nakayama, Tokyo (JP); Yoshiyuki Endo, Tokyo (JP)

(73) Assignee: Kabushiki Kaisah Sega Enterprises, Tokyo (JP)

( * ) Notice: Subject to any disclaimer, the term of this patent is extended or adjusted under 35 U.S.C. 154(b) by 0 days.

(21) Appl. No.: 09/257,705

(22) Filed: Feb. 25, 1999

(30) Foreign Application Priority Data

| Feb. 27, 1998 | (JP) | 10-048401 |
| Mar. 16, 1998 | (JP) | 10-065135 |
| Apr. 10, 1998 | (JP) | 10-098962 |

(51) Int. Cl.$^7$ .................... A63F 13/00; A63F 9/24; G06F 17/00; G06F 19/00
(52) U.S. Cl. ................. 463/36; 463/38; 463/46; 463/7; 273/273; 273/440; 273/445; 273/446; 446/175
(58) Field of Search ............. 463/1, 7, 33–35, 463/46, 47; 434/309, 345, 273; 273/440, 445–446; 446/242, 265, 266, 287, 297, 298, 299, 300–301, 302, 397, 406, 408, 418, 420, 175; D21/331, 332, 542, 353, 405, 409, 516

(56) References Cited

U.S. PATENT DOCUMENTS

| 4,089,598 | A | * | 5/1978 | Meyer et al. ............... 353/101 |
| 4,336,935 | A | * | 6/1982 | Goldfarb ..................... 273/1 E |
| 4,363,482 | A | * | 12/1982 | Goldfarb ................. 273/1 GC |
| D347,450 | S | * | 5/1994 | Nagata et al. ............... D21/13 |
| 5,405,153 | A | * | 4/1995 | Hauck ........................ 273/460 |
| 5,685,776 | A | * | 11/1997 | Stambolic et al. ............ 463/46 |
| 5,966,526 | A | * | 10/1999 | Yokoi ......................... 395/500 |
| 6,086,478 | A | * | 7/2000 | Klitsner et al. ............... 453/35 |
| 6,379,244 | B1 |   | 4/2002 | Sagawa et al. |
| 6,461,239 | B1 |   | 10/2002 | Sagawa et al. |

* cited by examiner

Primary Examiner—Jessica Harrison
Assistant Examiner—Alex F. R. P. Rada, II
(74) Attorney, Agent, or Firm—Keating & Bennett, LLP

(57) ABSTRACT

An electronic game apparatus constituting a body 101, comprising legs 103, and being capable of placement on an arbitrary surface. Further, a portion of the switches 102 of an operating portion are arranged in a location that differs from the surface on which a display panel 100 is provided, making operation easy.

11 Claims, 34 Drawing Sheets

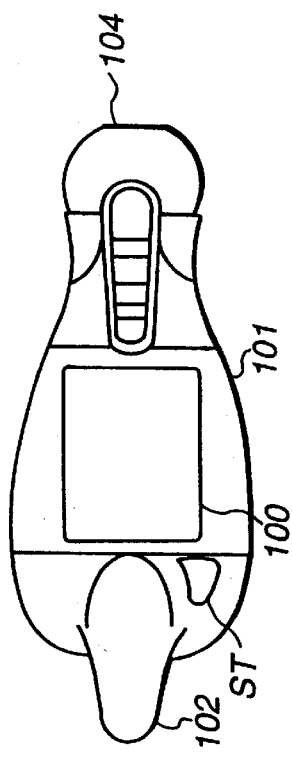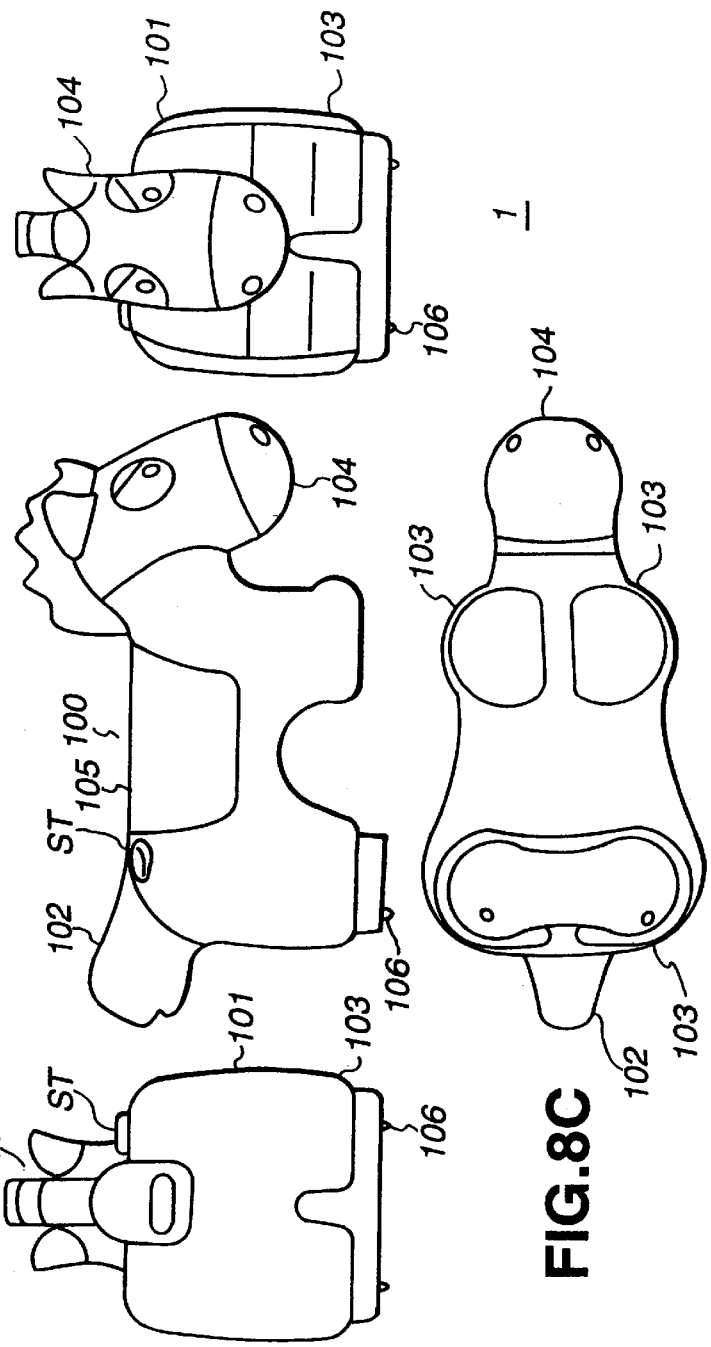

FIG.12
①  ICON (221)
- TURN THE JOG DIAL
- DISPLAYED WHEN SOUND EFFECTS 1, 2, 3 ARE GENERATED
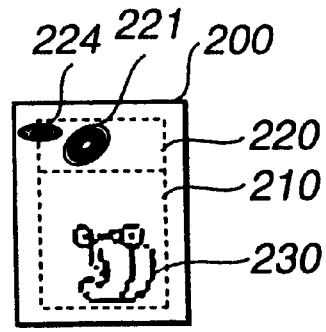
②  ICON (222)
- PRESS BUTTON D
- DISPLAYED WHEN SOUND EFFECTS 4, 5 ARE GENERATED
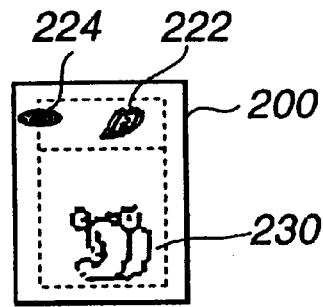
③  ICON (223)
- PRESS BUTTON D
- DISPLAYED WHEN SOUND EFFECTS 6, 7 ARE GENERATED
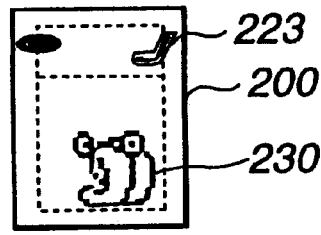
④  ICON (224)
- DISPLAYED WHEN THE PLAYER PLAYS
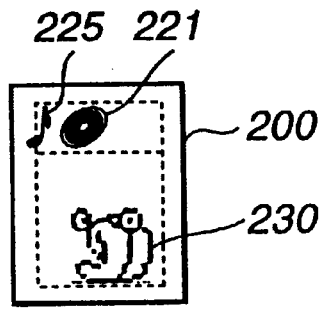
⑤  ICON (225)
- DISPLAYED WHEN THE EXAMPLE IS GENERATED

FIG. 20

① SWORDPLAY LEVEL METER

METER USED DURING SKILL TRAINING AND FIGHTING. YOU CAN ATTACK BY PRESSING THE BUTTON JUST WHEN THE LIGHTING BOLT SYMBOL IN THE MIDDLE OF THE LEVEL METER LIGHTS UP.

300

SWORDPLAY LEVEL METER  320
SCREEN  310
ICON  330
(TRAINING, INN/STATUS, PROVISIONS, INFIRMARY, DOJO)

② TRAINING ICONS

 MIND [WILL POWER (=SPEED) UP]

331  WATERFALL TRAINING ··· TRAINING TO AVOID FALLING OBJECTS WHILE STANDING UNDER A WATERFALL

SUCCEED = MIND pt→1-3pt UP (AVOID ALL ··· 3pt, 1 ERROR ··· 2pt, 1 ERROR ··· 1pt)

FAIL = MIND pt→1pt DOWN (FALL 3 OR MORE TIMES, GAME OVER)

RESET

1 GAME = 20 SECONDS (INDLUDING 2 SECOND INTRO, 2 SECONDS ENDING, FOR TOTAL OF 4 SECONDS) FALLING OBJECTS = AROUND 8

BUTTONS = (A) ··· MOVE LEFT, (B) ··· MOVE RIGHT, (C) ··· RESET

311
331

 SKILL [ATTACK POWER UP]

332  SWORD TRAINING ··· TRAINING TO SWING THE SWORD IN TIME WITH THE SWORDPLAY LEVEL METER.

SUCCEED = SKILL pt → 1-3pt UP(CLEAR ALL 3 TIMES ··· 3pt, 1 ERROR ··· 2pt, 1 ERROR ··· 1pt)

FAIL = SKILL pt → 1pt DOWN (FALL 3 OR MORE TIMES, GAME OVER)

RESET

1 GAME = 3 TIMES / 20 SECONDS (INCLUDING 2 SECOND INTRO, 2 SECOND ENDING, FOR TOTAL OF 4 SECONDS)

BUTTONS = SWORD BUTTON ··· SWINGS SWORD

312
332

 BODY [DEFENSIVE STRENGTH UP]

333  OUTDOOR TRAINING ··· TRAINING TO JUMP OVER OR DUCK UNDER OBSTACLES.

SUCCEED = BODY pt → 1-3pt UP (AVOID ALL ··· 3pt, 1 ERROR ··· 2pt, 1 ERROR ··· 1pt)

FAIL = BODY pt →1pt DOWN (FAIL 3 OR MORE TIMES, GAME OVER)

RESET

1 GAME = 20 SECONDS (INCLUDING 2 SECOND INTRO, 2 SECOND ENDING, FOR TOTAL OF 4 SECONDS) FALLING OBJECTS = AROUND 8

BUTTONS = (A) ··· JUMP, (C) ··· RESET, SWORD BUTTON ··· RUN

313
333

MIND GAME SCREEN

SKILL GAME SCREEN

BODY GAME SCREEN

BLACK BAND AT BOTTOM SCROLLS

FIG.24
INN
YOU WILL NOT BE ATTACKED
AS LONG AS YOU ARE AT THE INN.
DOJO
CHALLENGE THE DOJO AND TAKE
POSSESSION OF SIGNBOARD.
—350  MIND + 5PT
SKILL + 10PT
BODY + 5PT
VICTORY
—352  MIND − 5PT
SKILL − 10PT
BODY − 5PT
DEFEAT
—360
PROVISIONS
YOUR BODY STRENGTH WILL DECREASE
IF YOU DO NOT EAT.
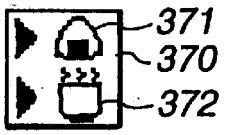—371
—370
—372
INFIRMARY
PROVIDES MEDICAL TREATMENT
WHEN YOU LOSE A FIGHT.
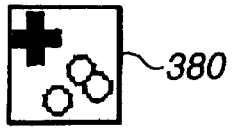—380

FIG.25D
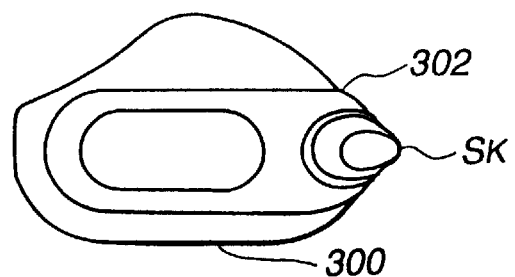
FIG.25B FIG.25A FIG.25C
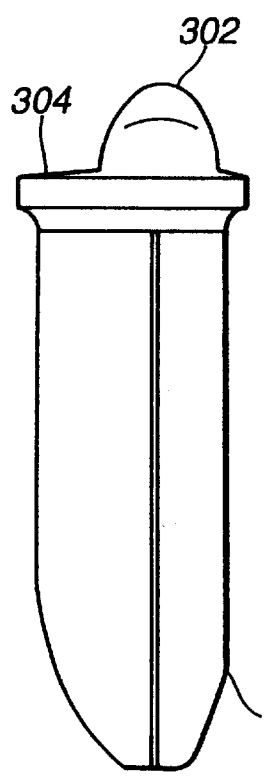 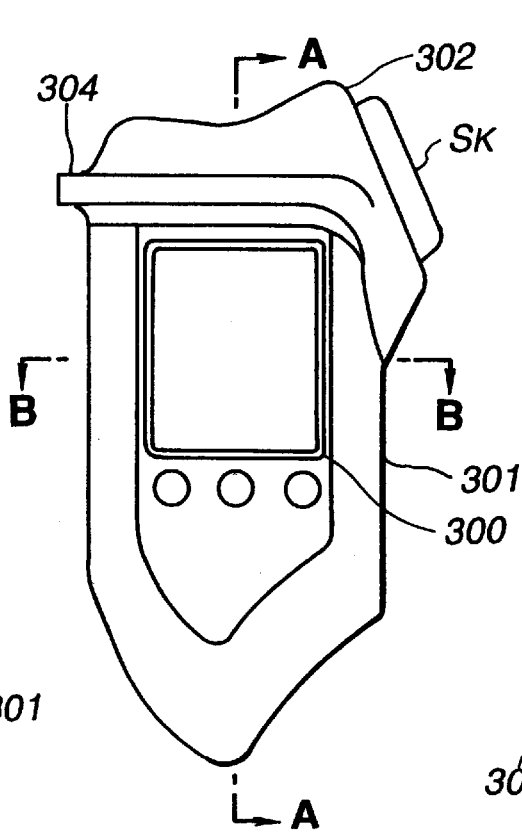 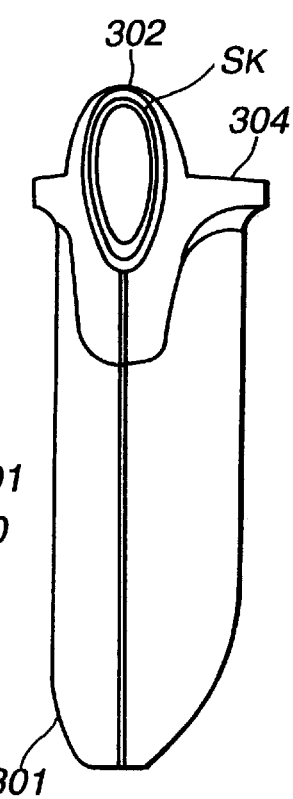
FIG.25E
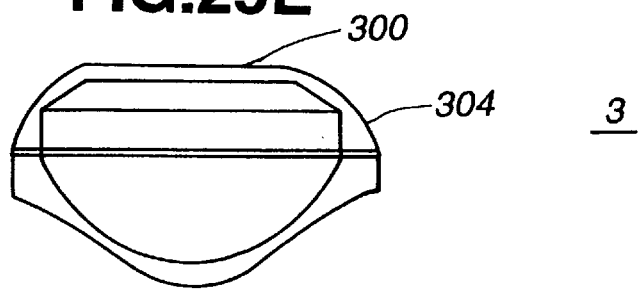

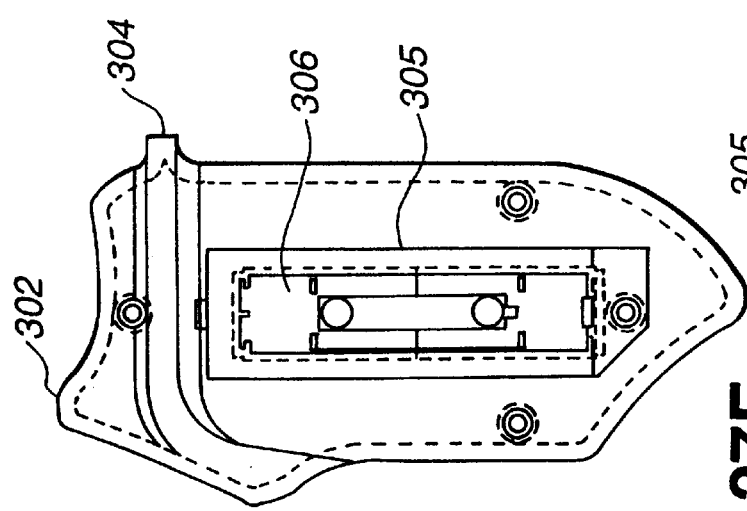
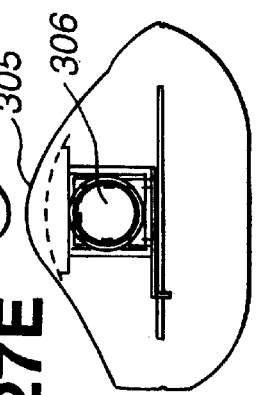
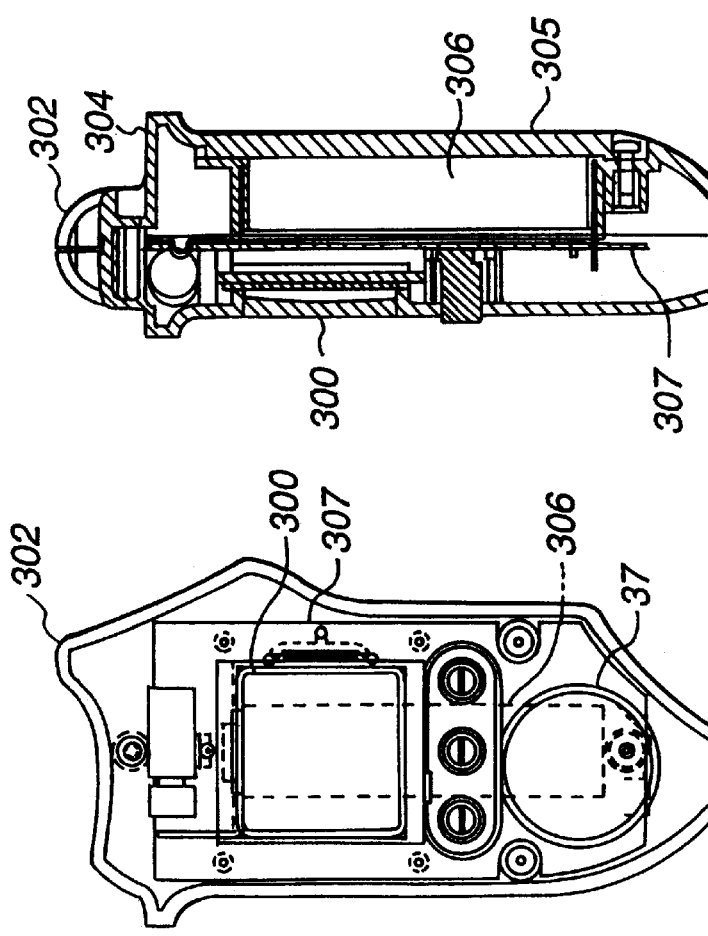
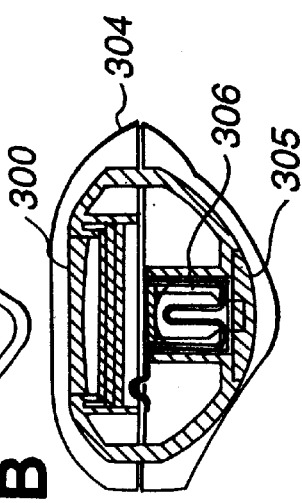
FIG.27D  FIG.27E  FIG.27A  FIG.27C  FIG.27B

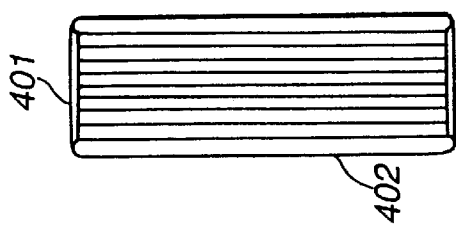
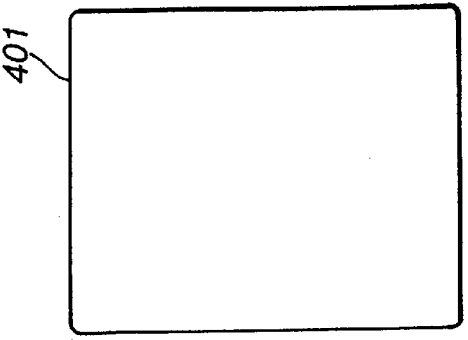
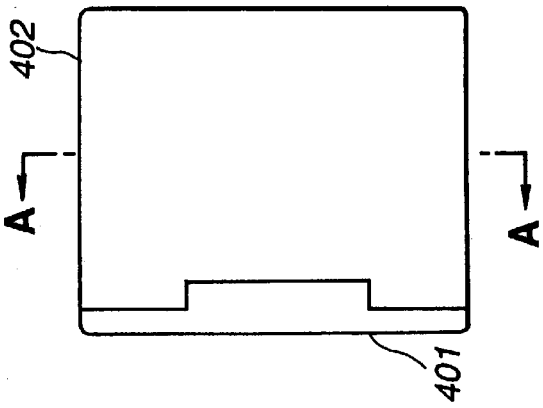
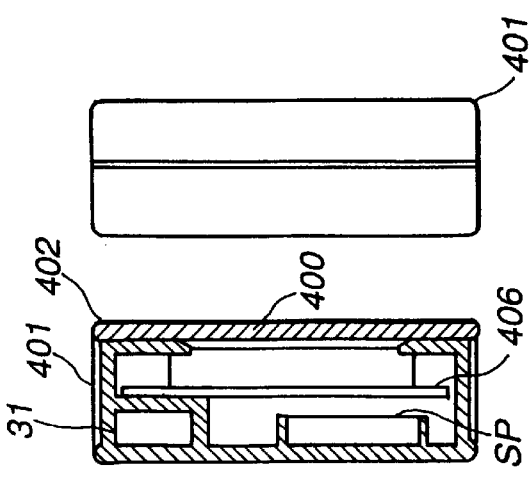
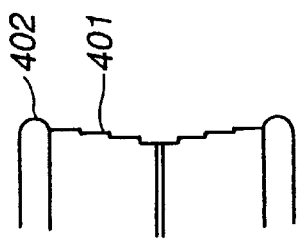
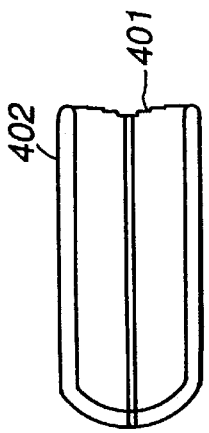

ELECTRONIC GAME APPARATUS

BACKGROUND OF THE INVENTION

1. Field of the Invention

The present invention relates to a palm-sized electronic game apparatus, and more particularly to a proposal for a new electronic game apparatus.

2. Description of the Related Art

In the past, there were the so-called mini-games, which came with keyholders. The mini-game constituted a body formed in the shape of either a rectangular box or an egg, and was equipped on a specific surface with a small, square, tens-of-dot liquid crystal panel, and a number of operating buttons. The contents of games processed on mini-games such as this were mostly popular game titles for home game machines and commercial game machines that had been customized for the mini-games. Further, there were also those apparatus, which were in the so-called simulation game category of games, wherein a character displayed on a liquid crystal panel was treated as a virtual pet, and during the course of the game, the character is "fed" and given "shots" as it is "raised."

Conversely, there are electronic musical instruments, such as electronic pianos, which generate sounds electrically, wherein a keyboard and the like functions as switches, and when a predetermined key (switch) is pressed by a performer, a built-in electronic circuit operates on the basis of a predetermined computer program, outputting a sound of a corresponding frequency.

However, because mini-games had diminutive operating buttons, and were designed on the premise that they be operated while being held in the hand, they were difficult to operate. In accordance with the type of operating button, it is necessary to frequently press buttons like a "turbo button," but because conventional mini-game operating buttons are mounted on the front panel, they are difficult to operate.

Further, even though a mini-game is a game that conforms to a popular game title, operability and image quality cannot compare to those of home game machines and commercial game machines, and interest wanes easily. The typical external shape of the mini-game, and monotonous display in particular add to the tendency for young people to readily tire of these games.

Furthermore, a conventional game is constituted so that the score can be increased by rapidly pushing this "turbo button" in a random manner, but since the comparative merits and demerits of game operation are determined simply by the rapid pushing of a button, it is not very interesting.

Conversely, a mini-game is comprised of schematics whereby an "Enemy" is conquered, or a main character is "raised" as a so-called game. But music lovers have been waiting for a tool that they can readily carry around with them, and experience the fun of playing music as well as games.

Furthermore, a vibrator, which is so often utilized with a portable telephone, is effective for indicating that an electronic apparatus has achieved a certain state without bothering other people. If this function were to be incorporated into a simulation game or the like, it would become possible to play a game intermittently throughout the day. Further, a game known as point-scoring fortune-telling, which uses cards on which meaningless messages and points are printed, has exhibited latent popularity for some time, but this card game has never been implemented electronically. It is felt that a mini-game, by its very portability, comprises an aspect that is well-suited to a simple game such as this. Further, an electronic musical instrument generates sound by pressing or touching a specified location with a finger or the like, but there has never been an acoustical product that generates sound using a method other than this.

SUMMARY OF THE INVENTION

With the above-mentioned conventional inconveniences in view, an object of the invention of the present application is to propose an electronic game apparatus, which is novel in both aspect and function, and which solves for the dissatisfaction associated with a conventional mini-game.

A first object of the present invention is to provide an electronic game apparatus having a shape that facilitates operation.

A second object of the present invention is to provide an electronic game apparatus with an appealing shape.

A third object of the present invention is to provide an electronic game apparatus, which requires consistent operating timing, and which features operation that is more difficult and more interesting than that of a conventional product.

A fourth object of the present invention is to provide an electronic game apparatus, which comprises an operating portion, which imitates a turntable operated by a disc jockey, and which combines elements of a musical instrument with elements of a game.

A fifth object of the present invention is to provide an electronic game apparatus that enables the provision of a game, which requires a sense of constant rhythm to operate, and which is not available in a conventional product.

A sixth object of the present invention is to provide an electronic game apparatus, which makes it possible to use vibration to alert a player that it is time to perform an operation.

A seventh object of the present invention is to provide a novel electronic game apparatus, which is constituted to enable the increase and decrease via a subordinate game of a value that determines the action of a character that moves in accordance with an operation.

An eighth object of the present invention is to provide an electronic game apparatus, which enables the realization of a game that generates a different display in accordance with fate, such as a written oracle, fortune-telling, or Russian roulette. A ninth object of the present invention is to provide an electronic game apparatus, which comprises a sound generation mechanism that differs from that of a conventional electronic musical instrument.

The invention that solves for the above-mentioned first object is an electronic game apparatus comprising a display panel capable of displaying a game image, and an operating portion in the same body, this electronic game apparatus being constituted to enable placement on an arbitrary surface in accordance a body comprising legs. Further, the present invention is an electronic game apparatus comprising a display panel capable of displaying a game image, and an operating portion in the same body, wherein either a portion or all of the switches of the operating portion are positioned in a location that differs from the surface on which the display panel is provided. For example, the switches are provided in a location, such as a side surface, bottom surface, or the like, where they are easy to operate by finger in a hand-held state, from the standpoint that it is a game that fits in the palm of the hand. Further, the shape of the body is asymmetrical so as to be readily carried in one hand, and the operation portion is provided on a side surface so as to be operable by thumb while being carried in one hand.

As for the invention that solves for the above-mentioned second object, the body is a model of a character related to the game. The use of a character makes it possible to arouse the interest of players in the lower age brackets in particular.

The invention that solves for the above-mentioned third object is an electronic game apparatus constituted to enable the operating state of the operating portion in accordance with the player to be reflected in the movement of a game character, this electronic game apparatus being constituted so as to enable the provision of an operative period, during which the operating state of the operating portion is treated as operable, and an inoperative period, during which the operating state of the operating portion is treated as inoperable, and the processing of the game changes when the player operates the operating portion during the operative period, and when the player operates the operating portion during the inoperative period.

And similarly, the present invention is an electronic game apparatus constituted to enable the operating state of the operating portion in accordance with the player to be reflected in the movement of a game character, this electronic game apparatus comprising reading means for reading the operating state of the operating portion; operative-inoperative deciding means for stipulating an operative period, during which the operating state of the operating portion is treated as operable, and an inoperative period, during which the operating state of the operating portion is treated as inoperable; determining means for determining whether the operating state of the operating portion falls within an operative period or falls within an inoperative period when read by reading means; and game processing means for changing the processing of a game in accordance with whether the operating state of the operating portion was read as being in an operative period or was read as being in an inoperative period by determining means.

And similarly, the present invention is an electronic game apparatus constituted to enable the operating state of the operating portion in accordance with the player to be reflected in the movement of a game character, this electronic game apparatus comprising an operating portion, which outputs operating signals in accordance with the operation of the player; and a control circuit, which executes a predetermined game program on the basis of the operating signals. The control circuit is characterized in that it stipulates an operative period, during which an operating signal inputted from the operating portion during game program processing is treated as operable, and an inoperative period, during which an operating signal inputted from the operating portion during game program processing is treated as inoperable, and changes game processing in accordance with whether an operating signal is inputted in an operative period, or inputted in an inoperative period. For example, the above-described control circuit stipulates whether in a feedback loop process in accordance with a game program the loop thereof is treated as an operative period or treated as an inoperative period.

The invention that solves for the above-mentioned fourth object is an electronic game apparatus, characterized in that it comprises a record turntable-imitating external shape as an operating portion, which is capable of rotating on a rotation axis, and comprises a rotation switch, which is constituted to be able to detect the rotation, or lack of said, thereof.

The invention that solves for the above-mentioned fifth object displays on the display panel a predetermined icon in near synchronization with a specific rhythm pattern, treats the display timing of this icon as an operative period, treats a period other than the display timing of this icon as an inoperative period, and changes the processing of the game in accordance to whether or not the operation of the operating portion by the player is done in time with this rhythm pattern.

Furthermore, the present invention further has a mode changing switch and a sound switch as an operating portion, and comprises a sound generating circuit, which is constituted so as to be able to generate a predetermined sound; and a timer circuit, which outputs clock data, and is constituted so as to be able to switch to any of game processing, rhythm processing or clock processing in accordance with the operation of the mode changing switch. When rhythm processing is selected, a sound corresponding to the operation of the sound switch is generated by the sound generating circuit, and when clock processing is selected, clock data is displayed on the display panel based on timer circuit-outputted-clock data.

The invention that solves for the above-mentioned sixth object is an electronic game apparatus, which comprises a vibration generating device constituted to enable the transmission of a vibration to the body, and which is constituted to drive the vibration generating device in timing with the display of a predetermined character on the display panel so as to make it possible to alert the player of the appearance of this character. For example, the present invention is an electronic game apparatus, which is constituted to enable the display of an indicator icon, which prompts an operation by the player, and an operation icon, which makes known the operation timing of the operating portion, and which is constituted to enable the creation of a swordplay operating environment by treating only the display period of this operation icon as an operative period, and treating only the display period of the indicator icon as an inoperative period.

The invention that solves for the above-mentioned seventh object is constituted to enable the implementation of a subordinate game, which makes it possible to increase or decrease at one time during the course of a game a strength value, which is granted to a character to indicate this character's strength, which reflects the operation of the player.

The invention that solves for the above-mentioned eighth object is an electronic game apparatus comprising a display panel, which displays a plurality of images, this electronic game apparatus comprising a cover member, which covers the display panel, and being constituted to enable the display of a different image on the display panel each time the cover member is opened. For example, a cover member is secured in a freely opening-and-closing manner to a body equipped with a display panel, and the body comprises a switch, which detects whether the cover member is open or closed; memory, which stores a plurality of image data for displaying on the display panel; and a control circuit, which displays images on the display panel by reading image data from memory when the switch is in a conducting state. And the control circuit is constituted to enable the selection and display on the display panel of any of a plurality of image data stored in memory each time the switch is in a conducting state. For example, the control circuit implements a random number operation each time the switch is in a conducting state, and displays on the display panel by reading from memory image data specified by this random number operation. Further, the above-mentioned switch is a control circuit power switch, and the control circuit is constituted to enable a random number operation at the initial stage of power source conduction.

The invention that solves for the above-mentioned ninth object is an electronic game apparatus, characterized in that it comprises a plurality of light receiving means for detecting light; memory means, for storing a first program, which generates a sound of a frequency that differs for each light receiving means in accordance with the amount of light a light receiving means detects; computing means for executing the above-mentioned first program; and outputting means for outputting a sound generated by the execution of computing means.

Here, the present invention adjusts the amount of light receiving means-detected light in accordance with the area covering the light receiving means, and when the amount of light detected by the light receiving means is as small as the area covering the light receiving means is large, the computing means can control the sound volume so as to output a sound, which is as loud as the amount of light detected by the above-mentioned light receiving means is small.

Further, the present invention comprises a plurality of light generating means, which generate light, and adjusts the amount of light receiving means-detected light from a light generating means in accordance with the area covering the light receiving means, and when the amount of light from a light generating means detected by a light receiving means is as large as the area covering the light receiving means is large, the computing means can control the sound volume so as to output a sound, which is as loud as the amount of light from a light generating means detected by a light receiving means is large. Here, the above-mentioned memory means has the data of at least 1 scale, and the present invention may also comprise display means for displaying a sign, which specifies which one of the above-mentioned light receiving means is to be covered to generate a scale sound.

Further, with the present invention, memory means stores character data, which is displayed by display means, and a second program, which changes the appearance of a character, which is displayed by the above-mentioned display means in accordance with the scale playing state, and this second program may be constituted so as to be executed by computing means. The present invention is an electronic game apparatus, characterized in that it comprises a plurality of light receiving means for detecting light; display means for displaying a predetermined character; memory means for storing a program, which changes the appearance of a character, which is displayed by display means in accordance with the amount of light receiving means-detected light; and computing means for executing a program.

The present invention is an electronic game apparatus, characterized in that it comprises a plurality of light receiving means for detecting light; display means for displaying a predetermined character; memory means for storing a first program, which causes the generation of a sound of a frequency that differs for each light receiving means in accordance with the amount of light receiving means-detected light, data of at least 1 scale, and a second program, which changes the appearance of this character in accordance with this scale playing state and/or playing time; computing means for executing a program; and outputting means for outputting a sound generated in accordance with the computing means execution.

BRIEF DESCRIPTION OF THE DRAWINGS

FIG. 8 are external views of the embodiment of the first aspect, with (a) being a front view, (b) a left side view, (c) a bottom view, (d) a plan view, and (e) a rear view.

FIG. 12 are illustrations and explanations of icon displays of the second aspect;

FIG. 20 are illustrations and explanations of icons of the electronic game apparatus of the third aspect;

FIG. 24 are illustrations and explanations of other modes of the third aspect;

FIG. 25 are external views of an embodiment of the third aspect, (a) being a front view, (b) a left side view, (c) a right side view, (d) a plan view, and (e) a bottom view;

FIG. 27 are schematics of the insides of the embodiment of the third aspect, with (a) being an A—A cross-sectional view of FIG. 25 (a), (b) a B—B cross-sectional view FIG. 25 (a), (c) a front view of the inside when the top cover is removed, (d) a rear view when the battery cover is removed, and (e) a diagram schematically showing the location of the battery.

FIG. 32 are external views of an embodiment of the fourth aspect, (a) being a front view, (b) a rear view, (c) a right side view, (d) a left side view, (e) a bottom view (symmetrical to plan view), (f) is a cross-sectional view of an A—A cross section of (a), and (g) is an enlarged view of the right side portion of the bottom view;

DESCRIPTION OF THE PREFERRED EMBODIMENTS

Aspects of the preferred embodiments are described hereinbelow with reference to the figures. However, the technological scope of the present invention is not limited to these aspects of the embodiments.

First Aspect

A first aspect of the present invention is related to an electronic game apparatus comprising a novel external appearance and operating portion configuration. Since the game processed by this electronic game apparatus 1 is a horse racing game, the external shape of this electronic game apparatus 1 is modeled after a "race horse." It is desirable to mold the external shape of the electronic game apparatus like this into various models to match up with the content of a game. By forming the external shape of the electronic game apparatus into cutely deformed character shapes, it is possible to create a game apparatus that appeals to younger people.

Figure 1:
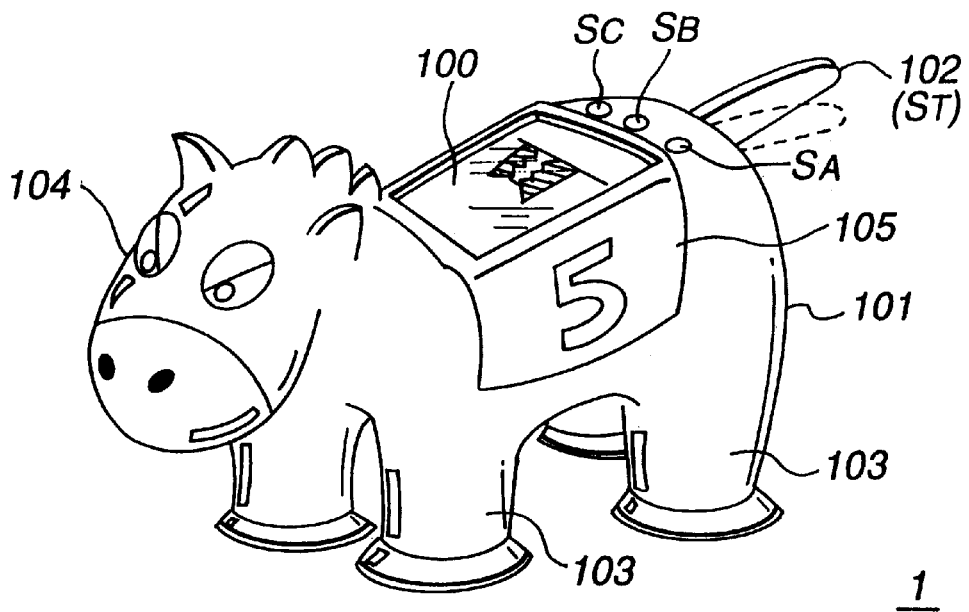
FIG. 1 is a front side oblique view of an electronic game apparatus of a first aspect.
Figure 2:
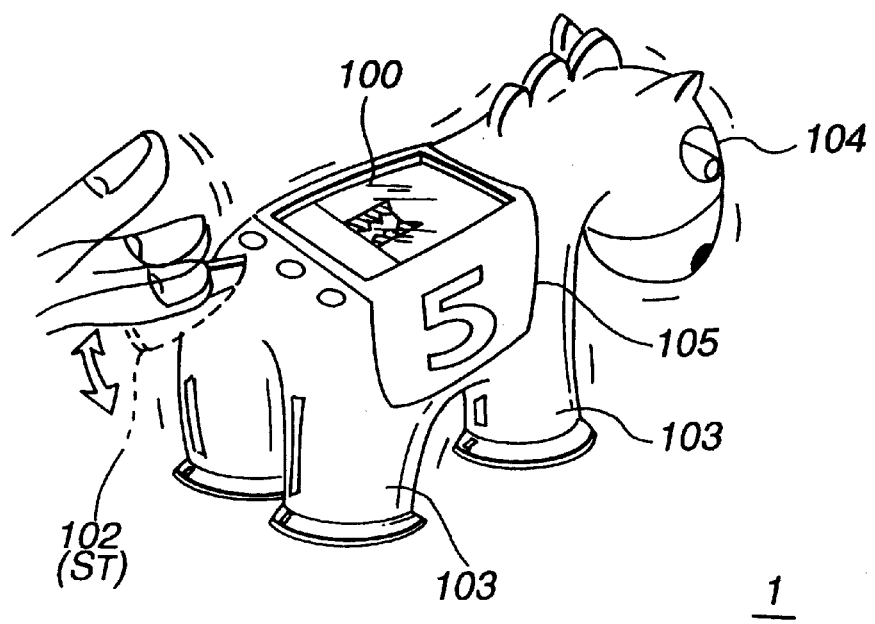
FIG. 2 is a back side oblique view of the electronic game apparatus of the first aspect.

FIG. 1 and FIG. 2 show a front oblique view and a rear oblique view of the electronic game apparatus 1 of this first aspect. As shown in these figures, this electronic game apparatus 1 comprises a main body 101, a tail portion 102, a leg portion 103, a head portion 104 and a saddle portion 105, and overall is formed in the shape of a "race horse." The location of the saddle portion 105, which corresponds to the back of the "race horse," is open, and a display panel 100 is provided. This game apparatus 1 is formed, for example, by molding a resin or the like so as to integrate each portion. The display panel 100 is a liquid crystal panel or some other image display element, and is constituted having, for example, 26 dots×26 dots. The main body 101 is formed to enable the game apparatus control device (FIG. 3) to be embedded therein. A speaker 27 (See FIG. 3) is mounted in the back side of the main body 101 (a location corresponding to the "belly" of the "race horse"), and a net mesh is applied to output sound to the outside. The tail portion 102, as shown in FIG. 2, is secured to enable up-down movement, and is constituted so as to be able to interlock with a switch ST to enable conduction or shutoff in accordance with up-down movement. This switch ST is endowed with a function corresponding to the "whip" for a "race horse." The leg portion 103 comprises four legs, and is formed to make it possible to place this game apparatus on an arbitrary surface. Operating switches SA, SB, and SC are provided on the main body 101 in a location corresponding to the rump of a "race horse" to enable the pushing thereof by a player. Furthermore, a strap corresponding to "reins" can be provided on the head portion 104. Further, the tail portion 102 need not be interlocked to the switch, but rather, a switch ST can be provided separately in a location corresponding to the base of the tail.

Figure 3:
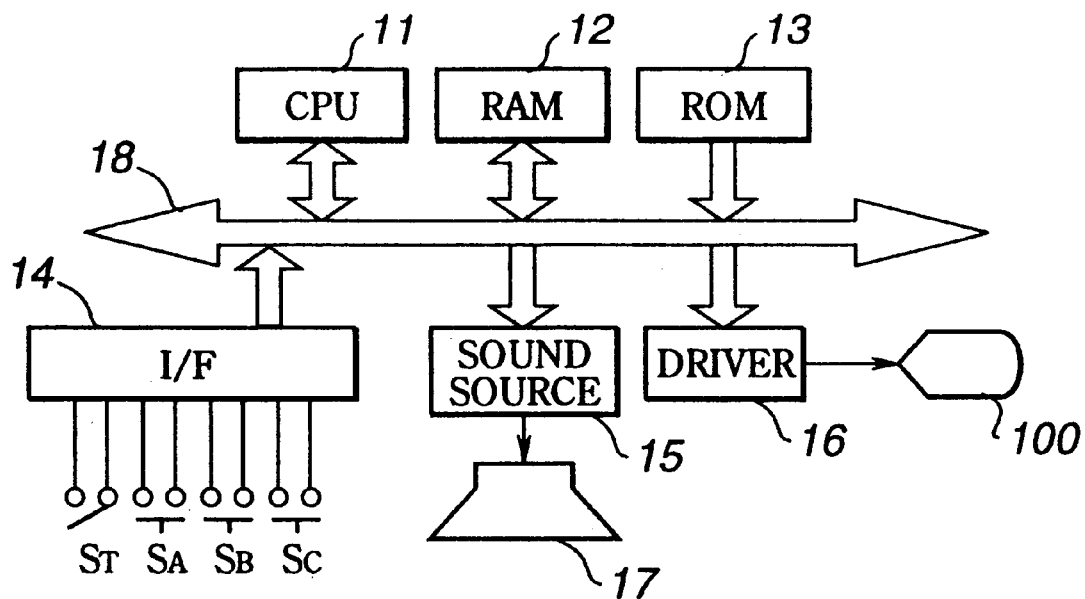
FIG. 3 is a block diagram of a control device of the electronic game apparatus of the first aspect.

FIG. 3 shows a block diagram of the hardware of this electronic game apparatus 1. This control device comprises a CPU 11, RAM 12, ROM 13, an interface circuit 14, a sound source circuit 15, and a liquid crystal driver 16. These circuits can be functionally constituted as a one-chip microprocessor rather than being made up of individual electronic devices. The CPU 11 is constituted to enable a game to be processed in this game apparatus 1 by executing program data stored in ROM 13. A 4-bit and 8-bit general-purpose microprocessor can be utilized in the CPU 11. RAM 12 is the active region of the CPU 11, and is constituted to enable the storing of variables required for the process execution of FIG. 5. ROM 13 is constituted to enable the storing of program data, the character and other bit map data displayed on the display panel 100, and the waveform data, which becomes the source of sounds generated by the sound source circuit 15. The interface circuit 14 connects a switch to a bus 18, and connects switch ST and operating switches SA, SB and SC to enable the operating state to be read. The sound source circuit 15 comprises waveform memory and the like, and is constituted to enable a predetermined sound to be generated from the speaker 27 in accordance with the control of the CPU 11. The driver 16 is a liquid crystal driver, and is constituted to enable the display in a specified location of the display panel 100 of bit map data-based images, and character data-based alphanumeric characters transmitted in accordance with the CPU 11.

Figure 4:
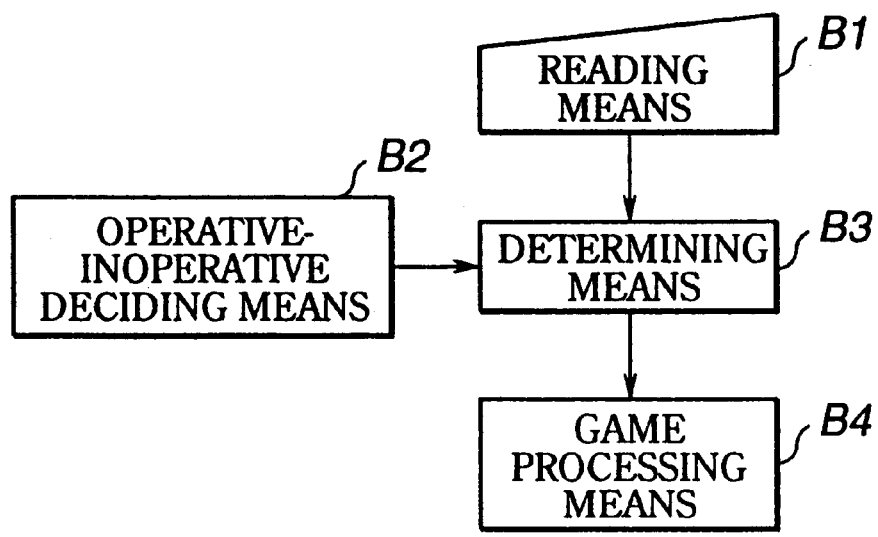
FIG. 4 is a block diagram of the functions of the electronic game apparatus of the first aspect.

FIG. 4 shows a block diagram of the functions realized by the hardware of the electronic game apparatus 1. This functionality block is constituted by comprising reading means B1 for reading the operating state of an operating switch; operative-inoperative deciding means B2 for stipulating an operative period, during which the operating state of an operating switch is treated as operable, and an inoperative period, during which the operating state of an operating switch is treated as inoperable; determining means B3 for determining in accordance with reading means B1 whether the operating state of an operating switch falls within an operative period or falls within an inoperative period; and game processing means B4 for changing the processing of a game in accordance with whether the operating state of an operating switch was read as being in an operative period or was read as being in an inoperative period by determining means B3. Reading means B1 is realized by a CPU 11 read operation relative to the interface circuit 14. Operative-inoperative deciding means B2 is realized by the CPU 11 performing a measurement in accordance with an internal timer. Determining means B3 is realized by the CPU 11 referencing the measured value of the internal timer in timing with the reading of an operating state by reading means B1, and making a determination. Game processing means B4 is realized by the CPU 11 operating in accordance with a program while using a determination result in determining means B3 as a condition for game progress, and outputting appropriate signals to the sound source circuit 15 and driver 16.

Description of Operation

Figure 5:
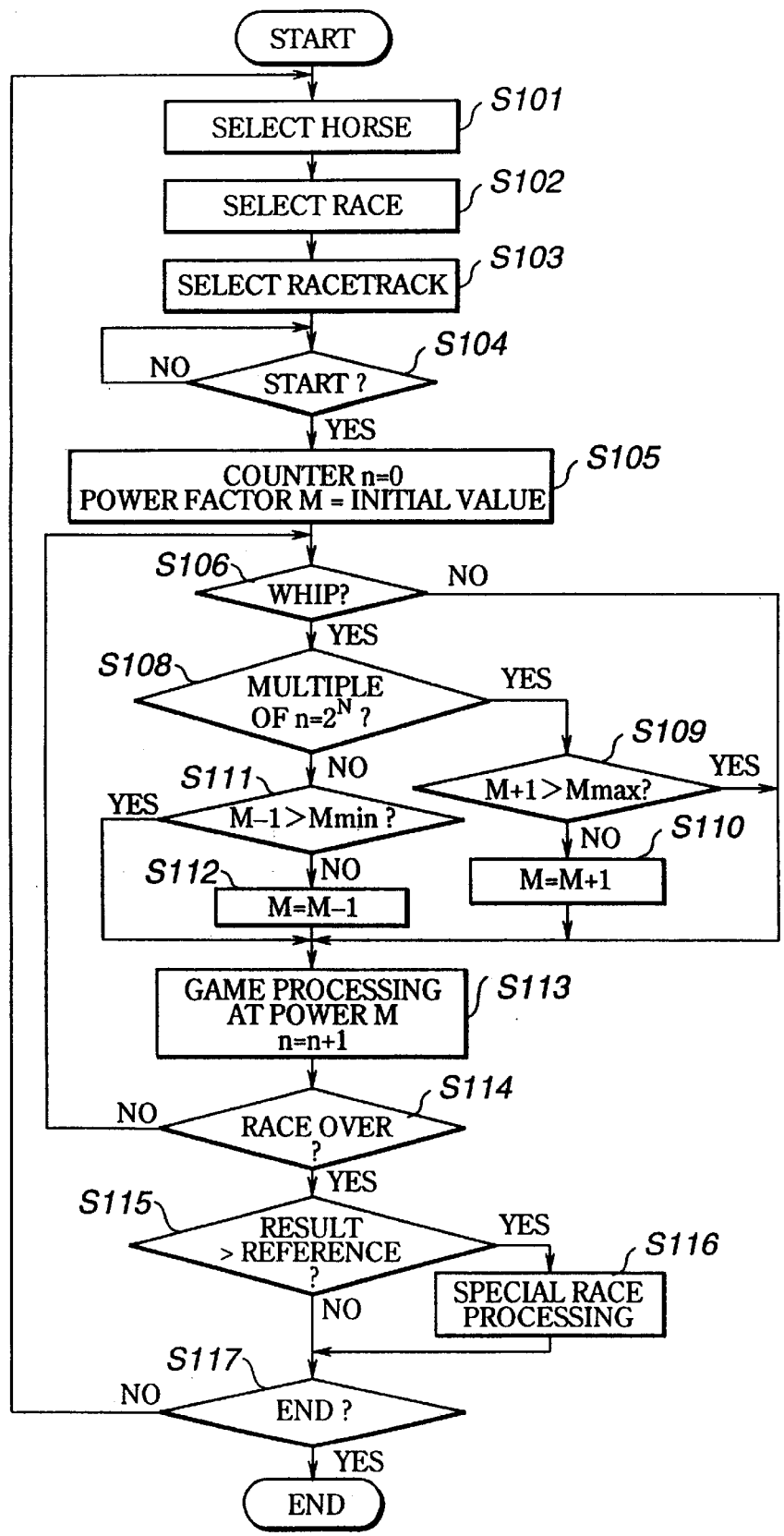
FIG. 5 is a flowchart of processing in the electronic game apparatus of the first aspect.

FIG. 5 shows a flowchart illustrating the operation of this electronic game apparatus 1.

Figure 6:
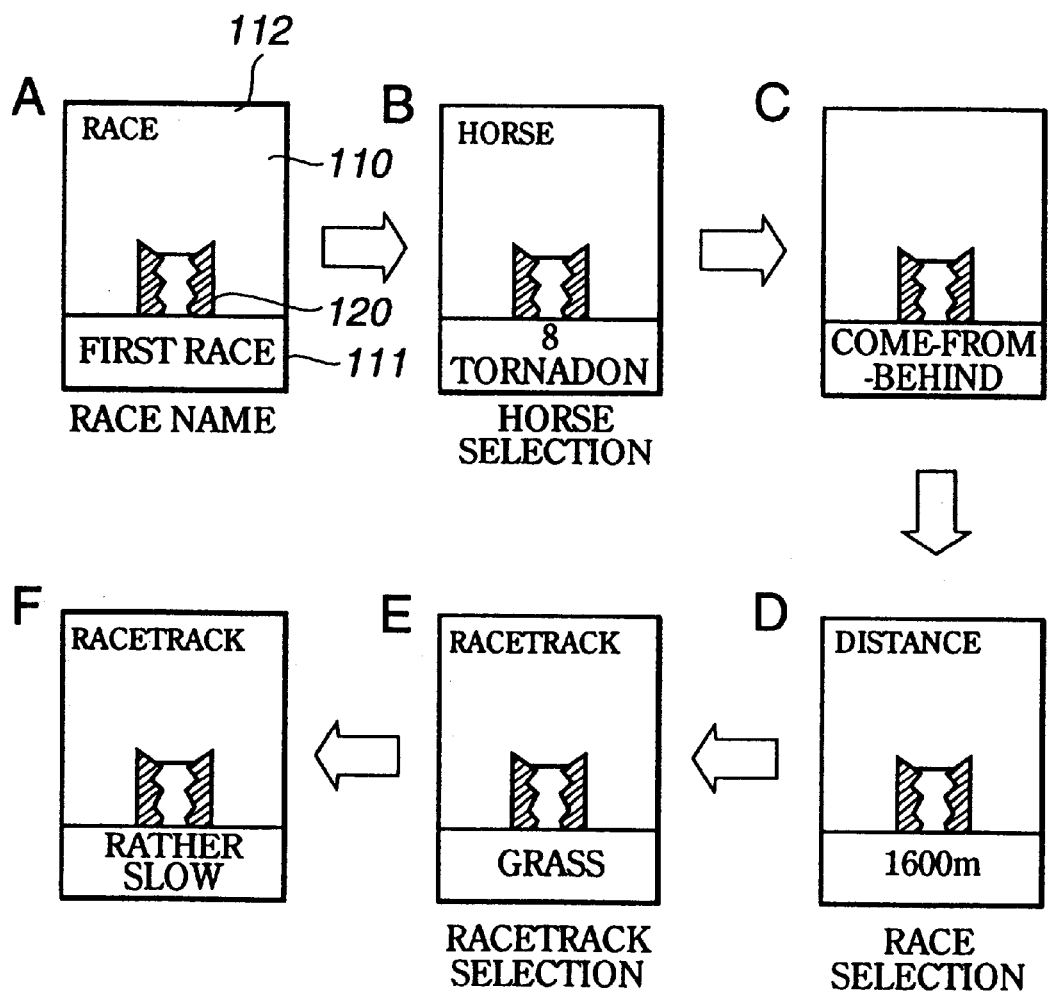
FIG. 6 is examples of display images of initial settings of the first aspect.

Since the game of this aspect is a "Horse Race," game play is started after selecting a horse, race, and a racetrack. First, the power goes on when a player pushes any of the operating switches. The CPU 11 executes a program stored in ROM 13 in order from the initial address. That is, game processing means B4 carries out processing. At first, the image shown in FIG. 6A is displayed on the display panel 100. The display of the display panel 100 is made up of a game display area 110, an alphanumeric character display area 111, and an auxiliary alphanumeric character display area 112. A horse character 120, which corresponds to the operation of a player, is displayed in the game display area 110. The name of the race is displayed on this screen.

Next, horse selection processing is performed (S101). As shown in FIG. 6B, the auxiliary alphanumeric character display area 112 displays "horse," indicating that a horse is to be selected. A player selects a horse by operating the operating switches SA, SB and SC. Horse data comprises the name of a horse, and correspondent personality data, which determines the "disposition" of the horse thereof, as shown below.

Horse Selection

| Name | Personality |
| --- | --- |
| Burning Toast | Take-the-lead type |
| Tornadon | Come-from-behind type |
| HeyYouWait | Come-from-behind type |
| Avogadias | Take-the-lead type |
| Tronbokan | Come-from-behind type |
| Monohosaleo | Take-the-lead type |
| Melengen | Take-the-lead type |
| Dandy Honey | Come-from-behind type |
| Godaigo Monkey | Come-from-behind type |
| LeLeHo | Take-the-lead type |

This game is constituted so that the development of the race changes, during game processing in accordance with the personality of the selected horse. For example, for a horse determined by the personality data to be a "Take-the-lead type," a course expediently determined for game processing is set so that the horse rapidly advances for the first half, and his forward speed declines for the latter half. For a horse determined by the personality data to be a "Come-from-behind type," the course is set so that the horse moves forward slowly at first, but picks up speed during the latter half. When a horse is selected, the name of the horse is displayed in the alphanumeric character display area 111 as shown in FIG. 6B, and then the personality thereof is displayed as shown in FIG. 6C.

Next, the distance of the race is selected (S102). As shown in FIG. 6D, the term "distance" is displayed in the auxiliary alphanumeric character display area 112, and the distance of the race is displayed in the alphanumeric character display area 111. The player selects the distance of a race by pressing any of the operating switches. For example, as race distances, the following distances are provided.

Distance 1200 m, 1600 m, 2000 m, 2400 m, 3200 m

Following distance selection, racetrack-selection is performed (S103). As shown in FIG. 6E, the term "racetrack" is displayed in the auxiliary alphanumeric character display area 112, and either dirt or grass is displayed in the alphanumeric character display area 111. The player uses an operating switch to select either one. Furthermore, as shown in FIG. 6F, the racetrack condition type is displayed in the alphanumeric character display area 111. The types of conditions, for example, are good, slightly slow, slow, and bad. The condition of the track is reflected in whether the character being operated loses its stamina (specified as a value indicating the power of a horse) quickly or slowly.

Figure 7:
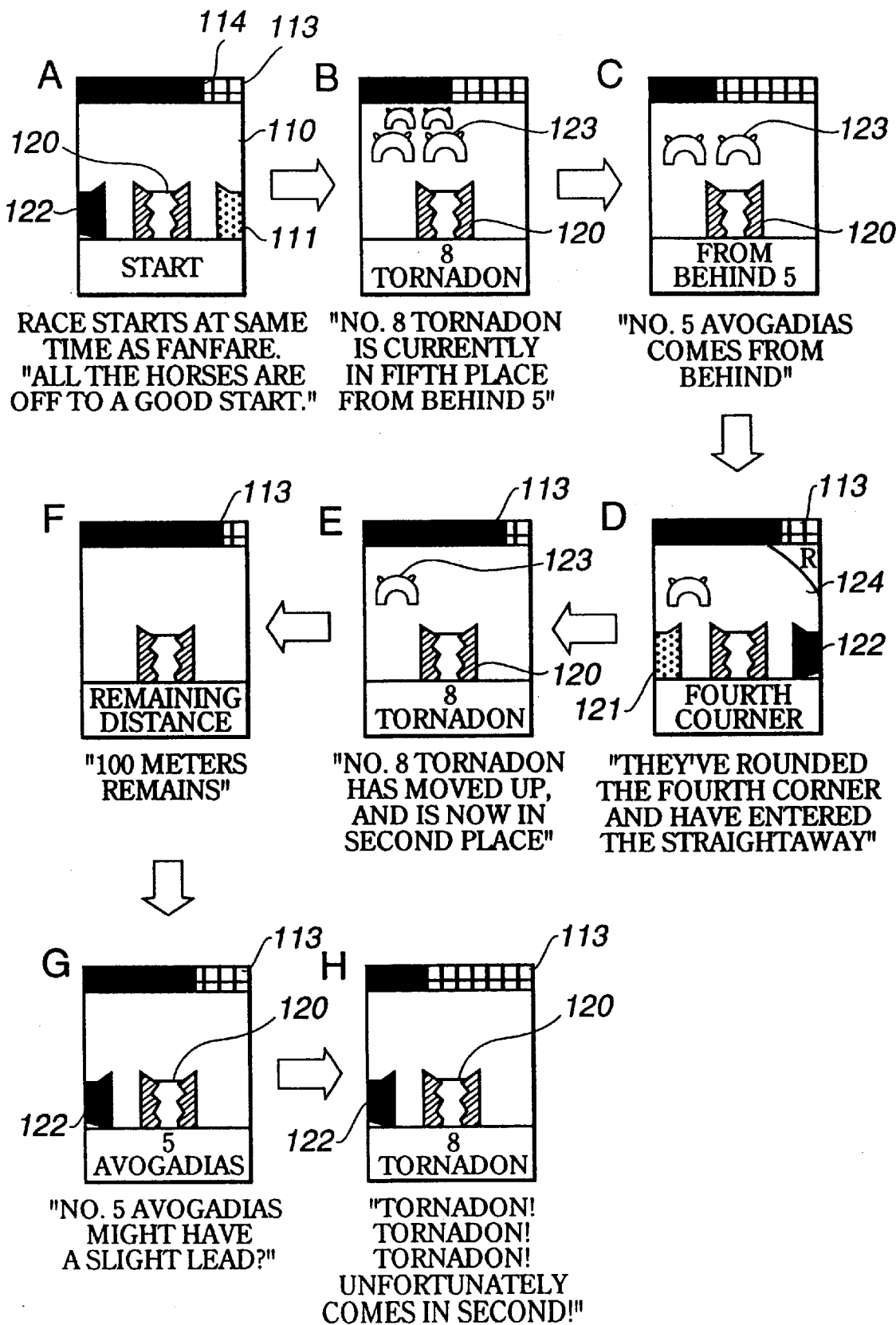
FIG. 7 is examples of display images during game processing of the first aspect.

The above completes pre-game selection processing. The game waits for the player to push an operating switch (S104:NO), the display shown in FIG. 7A is displayed, and the race starts (S104:YES). The CPU 11 resets the loop counter n, which counts the number of loops, and sets to the initial value a power factor M, which represents the stamina of a character 120. The significance of the power factor is that the more it increases, the longer the race continues. The minimum power factor value is Mmin, and the maximum power factor value is Mmax. The CPU 11 causes the sound source circuit 15 to generate sounds that accord with the progress of the game, such as the fanfare, and the opening of the gate. In accordance therewith, the game's sound effects are generated so as to correspond to the display. At the start of loop processing, the CPU 11 refers to the interface circuit 14, and references whether or not the switch ST indicating the whip has been pressed. That is, reading means B1 operates. When switch ST has not been pressed (S106:NO), the character 120 advances at that power factor M. This power factor M is displayed in the stamina meter column 113 of the display panel 100. An indicator 114 shows the current stamina of the character 120.

When switch ST has been pressed, that is, when the whip is being used (S106:YES), a check is done to determine if the loop counter n is an integral multiple of the normal value 2N (S108). That is, the measured value of operative-inoperative deciding means B2 is determined by determining means B3. More specifically, a check is done to determine if the lower bit of a variable indicating the loop counter n, which operates in binary, is a 0. This computation can be such that it enables detection of 1 of several opportunities, and the computation method is selectable so that the computation burden is minimal. When the loop counter n is an integral multiple of the normal value 2N (S108:YES), this loop is processed as an operative period. That is, as long as it does not exceed the maximum value Mmax (S109:NO), the power factor is incremented by 1 (S110). In accordance therewith, the stamina of the character increases. That is, game processing means B4 changes the content of game processing. When the loop counter n is not an integral multiple of the normal value 2N (S108:NO), this loop is processed as an inoperative period. That is, as long as it does not fall below the minimum value Mmin (S111:NO), the power factor is decreased by 1 (S112). In accordance therewith, the stamina of the character decreases. Game processing is subsequently performed based on the power factor M, which either increased, decreased, or remained the same (S113). At the end of loop processing, the loop counter is incremented by 1. If the race is not over (S114:NO), loop processing (S106 through S114) resumes once again.

The power factor M of the player-operated character 120 is determined as described above. If switch ST is pressed when the loop counter n is a multiple of 2N, the power factor M rapidly increases. However, if switch ST is pressed out of synch with the timing of the loop counter n becoming a multiple of 2N, the power factor M decreases. Therefore, if the player can "swing the whip" (press the switch ST) in synch with the unique timing at which this loop counter n becomes a multiple of 2N, the character can run long and fast.

Now a fixed power factor is determined in advance for the player-operated character 120, and other competing characters 121, 122, 123, . . . The CPU 11 sets the distance traveled during one loop process higher the greater the power factor of each "horse," and calculates the position of each relative to character 120. At this time, the amount of power factor consumed during one loop process is determined in accordance with the personality data of each horse. For a "horse," which is calculated to be in a relative position located in front of character 120, the character is displayed in accordance with the relative position thereof. Further, alphanumeric character data displayed in the alphanumeric character display area 111 is selected in accordance with the degree of progress and order on the course, and the alphanumeric characters shown in FIGS. 7B through G are displayed. For example, FIG. 7B is an example of a display when four "horses" 123 are determined to be in front of character 120. FIG. 7C is an example of a display when two "horses" 123 are determined-to be in the lead. FIG. 7D is an example of a display when the "horses" "pass" a location where there is a curve in the course, and the curve 124 is displayed.

Further, it is also an example of a display when the relative positions of "horses" 121 and 122 are determined to be zero, that is, when they have advanced only the same distance as character 120.

If the CPU 11 determines that character 120 has traveled the set distance, the race ends (S114:YES). An alphanumeric character display, which indicates the final order as shown in FIG. 7H, for example, is displayed on the display panel 100. Then points are calculated in accordance with the order thereof. When these points are higher than a previously determined reference point (S115:YES), special race processing is performed (S116). The basic operating procedures for special race processing are the same as described above. However, for a special race, the amount of power factor consumption, that is, the degree to which stamina is dissipated, is set higher, and it is desirable that it be set so that it becomes harder to achieve good results. If results are less than the reference point (S115:NO), the race ends when the special race ends. If the game itself is not ended (S117:NO), another race is run, and processing once again commences from the selection of a horse (S101).

Embodiment

Figure 9:
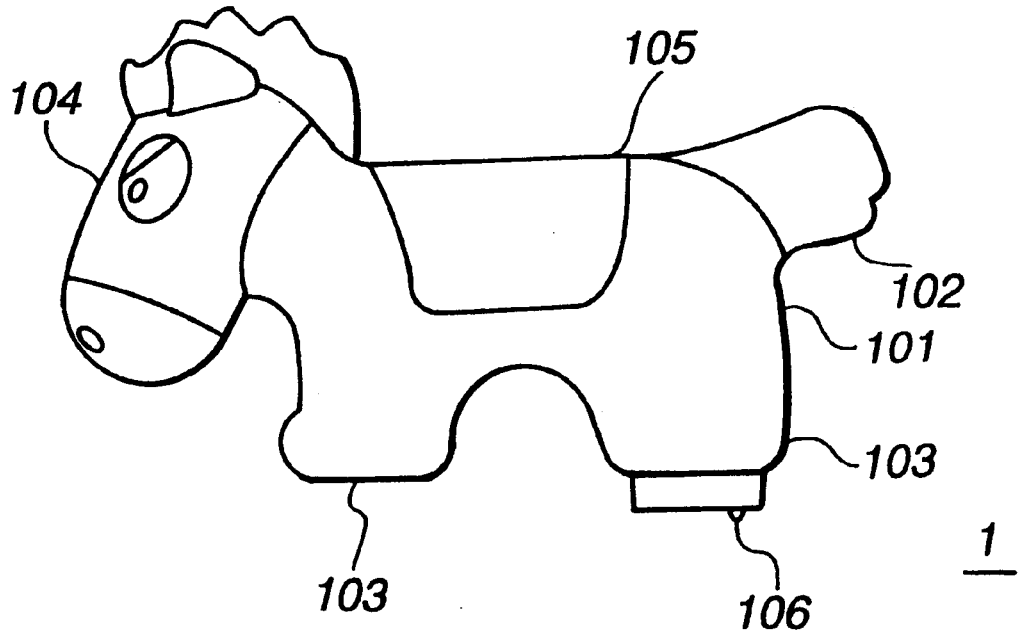
FIG. 9 is a right side view of an electronic game apparatus of the embodiment of the first aspect.

FIG. 8 and FIG. 9 show external views of the embodiment of the electronic game apparatus of this first aspect. In FIG. 8, (a) is a front view, (b) is a left side view, (c) is a bottom view, (d) is a plan view, and (e) is a rear view. And FIG. 9 is a right side view. In this embodiment, switch ST is not the tail 102, but rather, is attached to the "rump" portion of the horse. On a real horse, this is the portion where the whip strikes. Since the legs 103 are formed so that the horse leans slightly forward, the center of gravity will not shift toward the rear even when the switch ST is pressed furiously, enabling play in a stable state. Protrusion 106 is a member for ensuring that the horse can stand stably even when leaning forward. As can be seen from this embodiment, to enable the electronic game apparatus to be placed stably on a flat surface, it is desirable that it be supported at 3 points at least, and preferably supported at 4 or more points. Since most animals are supported at 4 points, a shape that imitates an animal is suitable as the external shape of the electronic game apparatus. As described above, in accordance with this first aspect, since the body is provided with legs, the game can be played by placing it on an arbitrary stand.

Further, because a switch, which is an operating portion, is provided in the tail, operation is easy, and the "horse" can be spurred on just as if a real whip were being used.

Further, because the power factor is increased or decreased each loop process in accordance with whether it is an operative period or and inoperative period, powering up a character is hard to do if operation is not in synch with the special timing that constitutes an operative period, thus requiring more skill than a conventional operating method, wherein rapidly pushing a button will suffice, and enabling game play to be made more interesting.

Second Aspect

Figure 10:
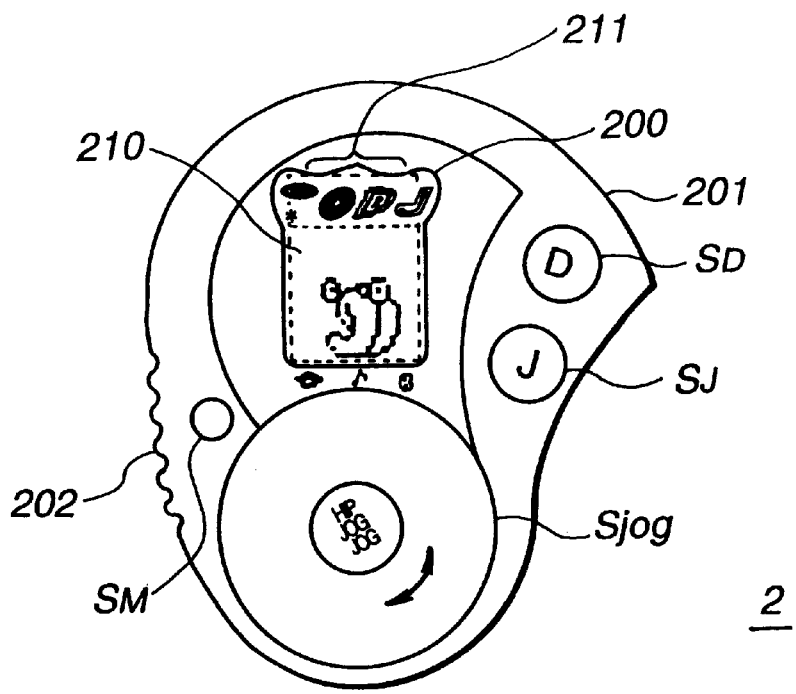
FIG. 10 is a plan view of an electronic game apparatus of a second aspect.

A second aspect of the present invention relates to an electronic game apparatus, which comprises an operating portion that imitates a disc jockey-operated turntable, and a constitution that enables the generation of sound. FIG. 10 shows a plan view of an electronic game apparatus 2 of this second aspect. The electronic game apparatus 2 of this second aspect, as shown in FIG. 10, comprises a display panel 200, operating switches SD, SJ, and SM, and a rotating dial Sjog in a body 201. The body of a conventional electronic game apparatus comprised a symmetrical shape when viewed as a plan view, but the body 201 of the game apparatus 2 of this aspect has an effective shape for being held and operated in one hand. That is, the body 201 is formed in an asymmetrical shape and size as shown in FIG. 10 so as to be easy to grip when being held in one hand. The body 201 further comprises a wave-shaped gripping portion 202, which is used to prevent slipping so that the body 201 does not readily slip around when being held in one hand.

Further, an operating switch is provided in a range the enables operation by thumb when held in one hand. The back side of the body 201 comprises a net mesh structure for transmitting to the outside sound generated by a speaker. The rotating dial Sjog comprises a shape that imitates a turntable. And the rotating dial Sjog can be rotated around a central axis in the direction of the arrows, and is constituted so that a different switch is turned on in accordance with the direction of rotation.

Further, the rotating dial Sjog is biased by spring means so that a bias force operates whether rotated to the right or rotated to the left from a reference position. Therefore, the rotating dial Sjog is constituted so that it returns to the reference position when not being operated. Operating switch SM is a mode changing switch, and is constituted to enable change so that this apparatus switches to any one of the game processing, rhythm processing or clock processing modes each time it is pressed. Operating switches SD and SJ are used for game processing and rhythm processing, and are constituted to enable the generation of a sound corresponding to the pressing thereof.

Figure 11:
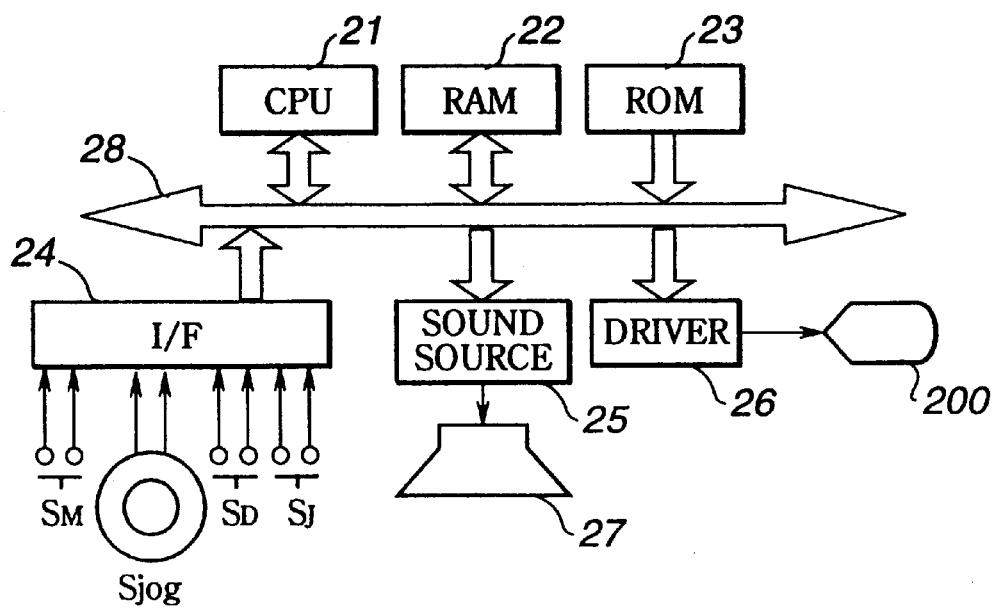
FIG. 11 is a block diagram of a control device in the electronic game apparatus of the second aspect.

FIG. 11 shows a block diagram of a control device of this electronic game apparatus 2. This control device comprises a CPU 21, RAM 22, ROM 23, an interface circuit 24, a sound source circuit 25, and a liquid crystal driver 26. A description of the CPU 21, RAM 22, ROM 23, sound source circuit 25, liquid crystal driver 26, and speaker 27 is omitted since the constitution thereof is the same as in the above-described first aspect. However,; the program data, bit map data, and waveform data stored in ROM 23 are data for this aspect. The interface circuit 24 connects the switches to a bus 28, and is connected to enable reading of the operating states of the rotating dial Sjog, as well as the operating switches SM, SD and SJ. The rotating dial Sjog supplies a different input signal in accordance with whether it is rotated to the right or rotated to the left. Further, to preserve past results, it is desirable that RAM 22 be either backed up by a super capacitor and battery or the like, or be nonvolatile RAM in order.

The display panel 200, as shown in FIG. 12, is constituted by being divided into a character display area 210 and an icon display area 220. A predetermined character 230 is displayed in the character display area 210 on the basis of bit map data stored in ROM 23. In the icon display area 220, 8 types of icons are displayed. A record-shaped icon (hereinafter referred to as the O icon) 221, a "D"-shaped icon (hereinafter referred as the D icon) 222, a "J"-shaped icon (hereinafter referred as the J icon) 223, a character notation icon termed "you" (hereinafter referred as the user icon) 224, and a musical note-shaped icon (hereinafter referred as the example icon) 225 are displayed. The O icon 221, D icon 222, and J icon 223 each come in two types: a small icon displayed outside of operating timing, and a large icon displayed during operating timing. The O icon is the symbol to rotate the rotating dial Sjog, the D icon is the symbol to press operating switch SD, and the J icon is the symbol to press operating switch SJ.

A plurality of waveform data are assigned to one operating switch. That is, when an operating signal is inputted from one operating switch, the CPU 21 is constituted to enable waveform data to be read from ROM 23 and transferred to the sound source circuit 25 in accordance with the processing mode and status at that time. For example, since there are a plurality of game stages available for game processing, when a stage changes, a different sound is assigned to each operating switch. Further, when an operating switch, other than the operating switch that should be operated, is pressed, a different sound is assigned to indicate an error. Examples of the types of operating switches, and the sounds generated, and icons displayed corresponding thereto are as shown hereinbelow. Naturally, icons and sounds are capable of changing by type of operating switch.

Relationship of Operating Portions, Icons and Sounds.

| Operating Switch | Icon | Sound |
|---|---|---|
| Rotating Dial Sjog | O icon | "jubi" "gui" "kirikiri" "garigari" |
| Operating Switch SD | D icon | "biyon" "poyon" "pi" |
| Operating Swithc SJ | J icon | "Here we go" "Oie" "Iyaa" "Bryu" |

Description of Operation

Figure 13:
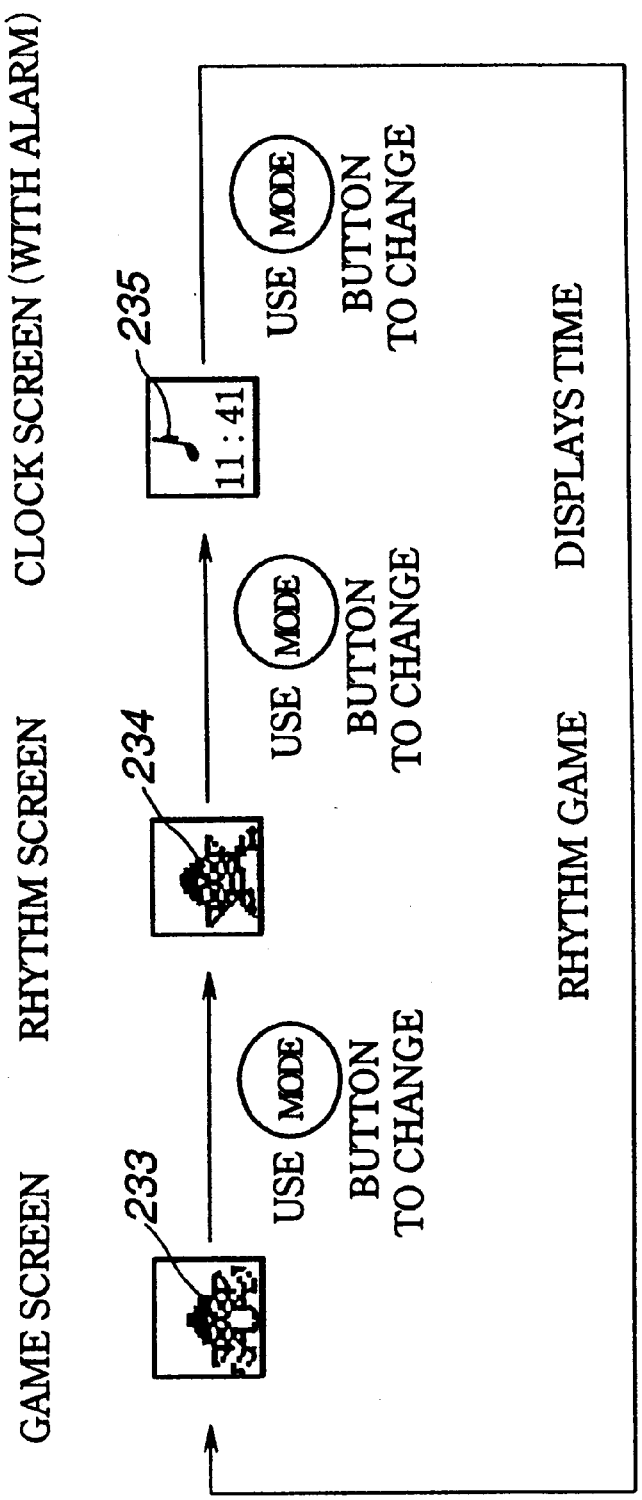
FIG. 13 is an illustration and explanation of mode changes in the electronic game apparatus of the second aspect.
Figure 14:
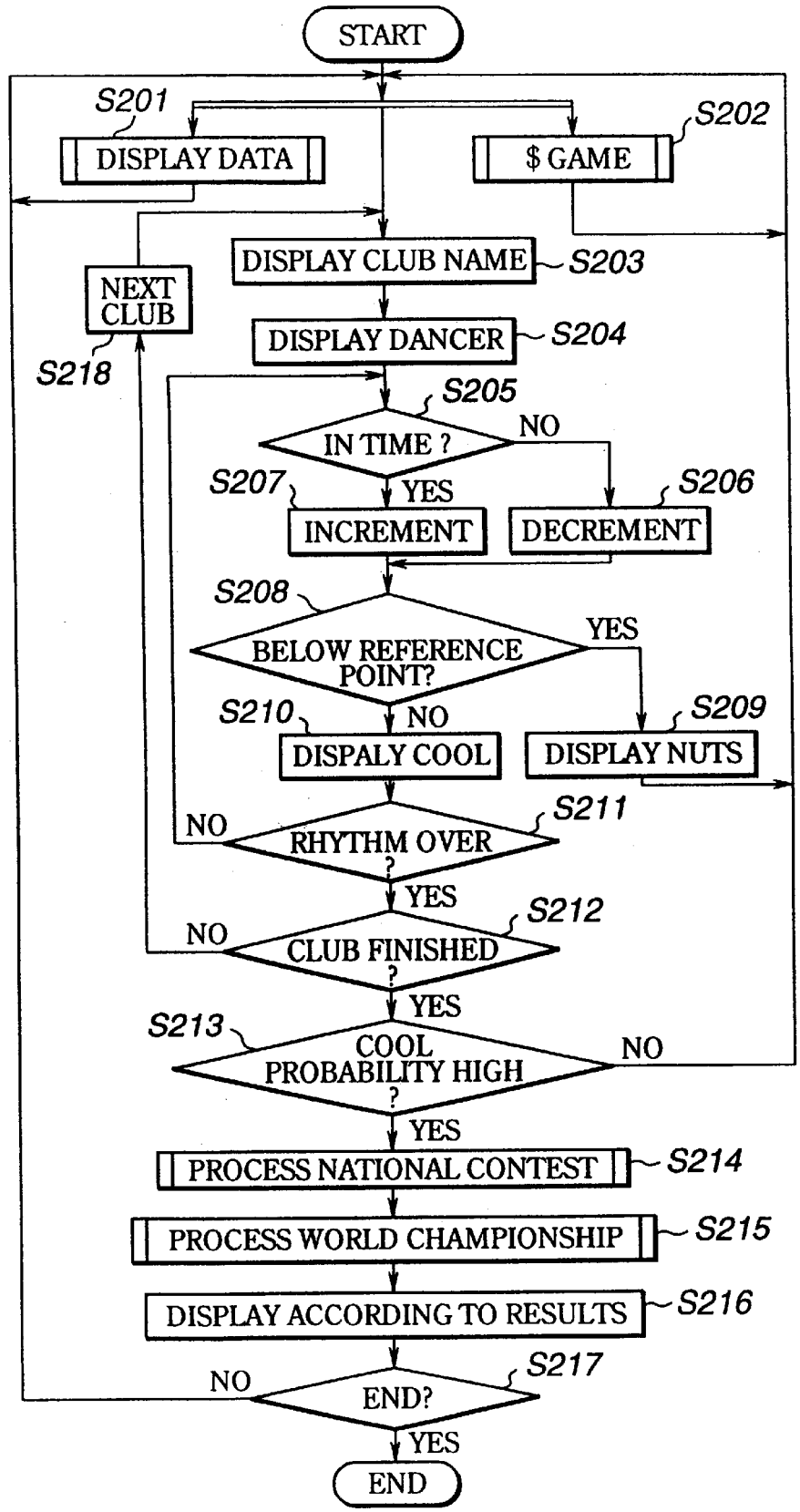
FIG. 14 is a flowchart of processing in the electronic game apparatus of the second aspect.

As shown in FIG. 13, the game apparatus 2 of this aspect enables game processing, rhythm processing or clock processing to be alternatively selected each time operating switch SM is pressed. When the player selects game processing, the game processing described in FIG. 14 is executed. When the player selects rhythm processing, a sound signal is generated by the sound source circuit 25 on the basis of the corresponding relationship between an operating switch and a sound, and a sound is emitted from the speaker 27. In display panel 200, an image, wherein a character 234, such as that shown in FIG. 13, moves in time to the sound, is displayed. Further, when the player selects clock processing, a timer circuit (not shown) operates, clock data is supplied to the liquid crystal driver 26, and a digital character display of a clock appears on the display panel 200. Further, the game apparatus comprises an alarm function in the clock processing mode. An icon 235 in the shape of a musical note is displayed correspondent to the presence or absence of the alarm function.

The processing that occurs when game processing is selected using operating switch SM is described now based on the flowchart of FIG. 14. In the game processing mode, when the player rotates the rotating dial Sjog in either direction, a message indicating any of the modes data display, game, or dollar ($) game is displayed on the display panel 200. When the desired mode message appears, rotating the rotating dial Sjog back to its original position, and pressing operating switch SD, which is the determining switch, causes the game apparatus to enter the mode thereof. When the data display mode (S201) is selected, a character code indicating past results is read from RAM 22, and the results thereof are displayed as alphanumeric characters on the display panel 200. For example, a message like "Contest 3, 55$^{th}$ place" is displayed. To check past results, the player selects this data display mode. When the $ game mode is selected (S202), a simple mini-game, which differs from the game of Step S203 and beyond, for example, a slot machine game, is implemented. For example, correspondent to pressing the start switch, an image, in which an icon revolves like a slot machine, is displayed. If the same icons line up horizontally, points are allotted, such as 500 points, 300 points or −100 points. The electronic game apparatus is constituted to enable the prize capable of being won in this mini-game to be added as carryover points to the game, which is implemented at Step S203 and beyond. To increase these carryover points prior to implementing the main game, the player selects this $ game mode.

Figure 15:
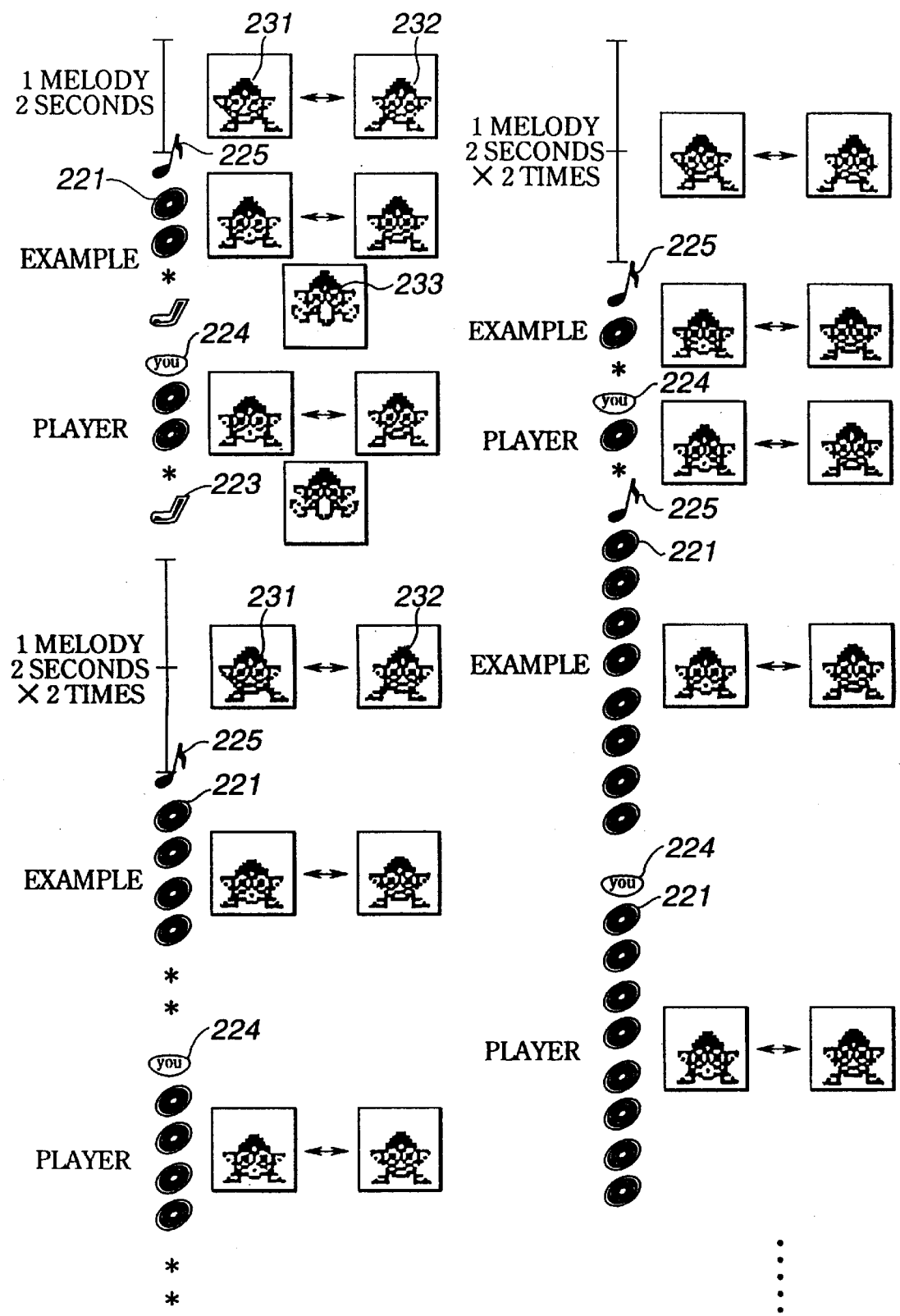
FIG. 15 are illustrations and explanations of game play in the electronic game apparatus of the second aspect.

Now, when game mode is selected (S203), the main portion of the game is started. When carryover points have been won in the $ game mode, these points are added in advance to the player's initial points. In this game, one game stage is constituted by the player "dancing" a character in time to a constant rhythm pattern in a so-called dance club. If the character dances well (if operation is skillful), a fixed display appears, the game stage in that dance club ends, and a game stage is repeated at another club. A different club name is assigned to each game. stage. The program is constituted so that when all game stages are completed with uniform results, the game can advance to a contest game stage, and on to a world championship game stage. At each game stage, a sound is generated, and an icon corresponding to this sound is displayed in accordance with a fixed rhythm pattern. The player operates the operating switch in time to this rhythm pattern. In other words, the player follows the rhythm. If operation is in accordance with the rhythm pattern, points are added, and if operation is out of time with the rhythm, points are deducted. More specifically, the processing of a game stage proceeds in the manner shown in FIG. 15. Game stage processing is constituted from a plurality of blocks, and each block is constituted using a melody performance, a phrase performance, which serves as an example, and a user performance in accordance with player operation-based phrase following. For example, in the first block, the CPU 21 transfers to the sound source circuit 25 from ROM 23 data that plays a melody, alternately reads from ROM 23 and displays on the display panel 200 bit map data, which matches the melody thereof. Characters 231 and 232, the dancers, who sway their bodies in time with the melody, are displayed in the character display area of the display panel 200 (S204). Next, the CPU 21 first displays an example icon 225 in the icon display area 220 for the example performance. In accordance with this icon, the player knows this is the example performance. The CPU 21 next displays the O icon 221 two times, and simultaneous to the display of the icon, transfers waveform data correspondent to the O icon 221 two times from ROM 23 to the sound source circuit 25. The icon display is displayed large at the timing at whuch the performance is being played, and is displayed small (or not displayed at all) at times outside thereof. In accordance with this O icon display, the player knows the timing at which to operate the rotating dial Sjog. Furthermore, CPU 21 similarly generates a sound corresponding to the display of the J icon 223. When it is time for the user performance, the CPU 21 cancels the display of the example icon 225, and displays the user icon 224 instead. Then the CPU 21 displays the O icon 221 and J icon 223 at the same sequence as the example performance. The player mimics these icon displays and the timing of the example performance, operating the operating switches in time with the icon displays. That is, the player rotates the rotating dial Sjog at the display timing of the O icon 221, and presses operating switch SJ at the display timing of the J icon 223.

The CPU 21 sets a fixed period before and after an icon display timing as an operative period, and sets a period outside thereof as an inoperative period. For example, the CPU 21 sets a flag, which specifies an operative period, to ON (sets the bit to "1") several loops before the timing at which an icon display instruction is given to the liquid crystal driver 26, and sets the flag to OFF (sets the bit to "0") several loops after the timing thereof. That is, a period of several loops before and after icon display timing is treated as an operative period. The CPU 21 reads the operating state when an operating signal is inputted to the interface circuit 24, and when the type of operating switch read is correct, references the flag at read time. The reading of an operating signal from the interface circuit may be done in accordance with a program during loop processing, even by interrupt processing. Then a determination is made as to whether or not the operating switch corresponding to an operative period was operated in accordance with the ON/OFF of the flag(S205). If it is determined that operation occurred during an operative period (S205:YES), a point is added (S207), and if it is determined that operation did not occurred during an operative period (S205:NO), a point is subtracted (S206). That is, when the player performs (operates) in accordance with the icon display-indicated rhythm pattern, operation is determined to be skillful, and a point is added, and when the player cannot perform in accordance with the rhythm pattern, operation is determined to be poor, and a point is subtracted. In addition to determining a score for each icon display like this, the game may also be constituted so that a determination is made following the completion of a user performance of 1 block as to whether or not an operation was performed during an operative period for either all or a fixed number (for example, 2 icons out of 3 icons) of icon displays.

Figure 16:
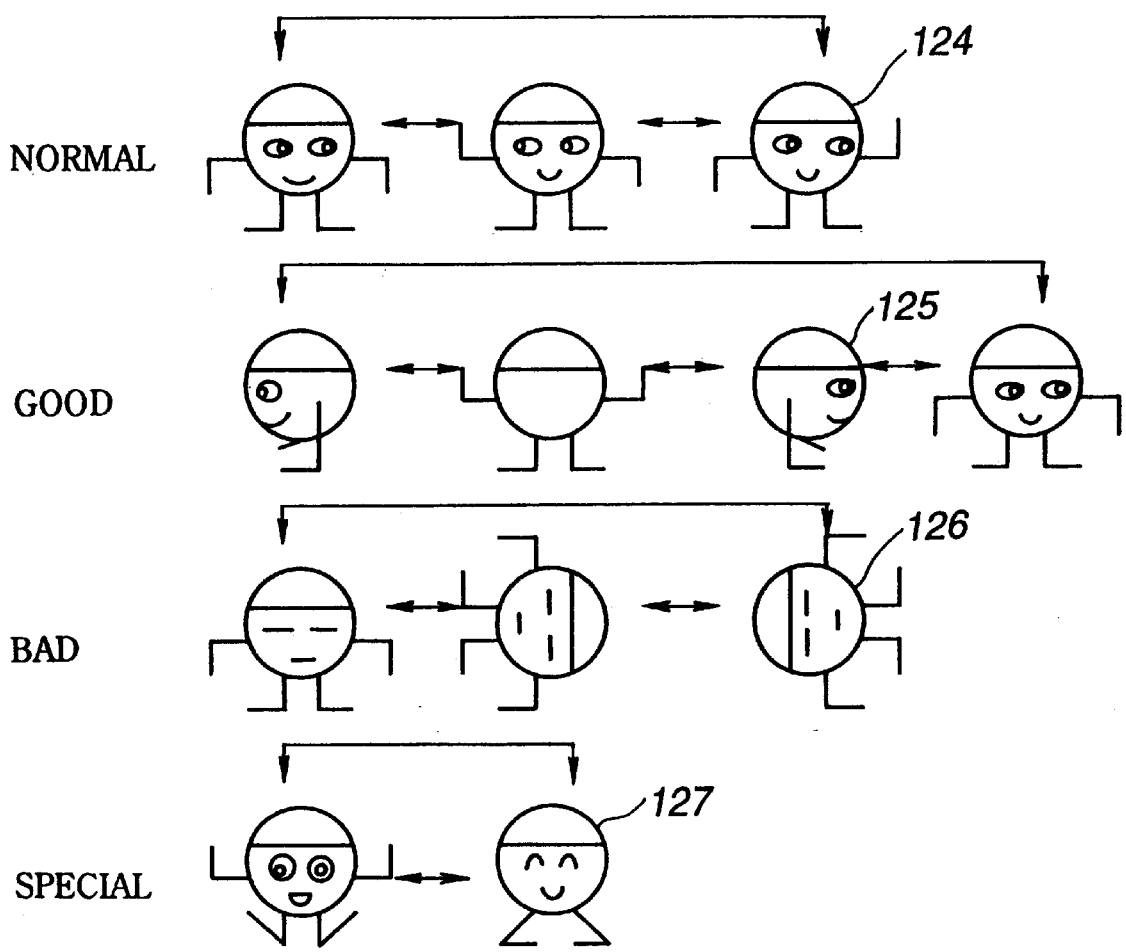
FIG. 16 are examples of character displays of the electronic game apparatus of the second aspect.

Furthermore, when the wrong operating switch was operated, for example, if operating switch SD is operated when rotating dial Sjog is supposed to be rotated, the CPU 21 transfers the waveform data of a sound representing an error to the sound source circuit 25 from ROM 23. In accordance therewith, a beeping sound like "pu" is generated. It is desirable that the game be constituted so that a point is deducted when an operating error occurs. It is desirable that the displayed character change in line with the operating state. For example, as shown in FIG. 16, a bit map pattern that displays four characters 124–127, "BAD," "NORMAL," "GOOD," and "SPECIAL," are provided. The degree of operating skill is indicated in the order of "BAD," "NORMAL," "GOOD," "SPECIAL." A score is determined at each block, and if points continue to be added, the character changes to indicate the skill level. While performing a rhythm pattern, an image in which each character appears to be moving in time with the music is displayed by sequentially changing the bit map pattern. When the score continues to drop, an image in which the "BAD" character 126 appears to leave the character display screen 210 can be displayed. At each operation, a determination is made as to whether or not the score is lower than the reference point (S208). When the score is lower than the reference point (S208:YES), a display indicating that operation is poor appears (S209), and loop processing returns to the start. For example, the term "NUTS" is displayed together with the character, and the game ends. When the score is greater than the reference point (S208:NO), a display indicating skillful operation appears (S210). For example, the term "COOL" is displayed together with the character. The above-described processing (S205–S210) is repeated so long as the rhythm pattern block continues (S211:NO). When all rhythm pattern blocks are complete (S211:YES), game play in that game stage, in other words, dancing in that dance club is finished. When there is another game stage, that is, when there is another club at which to dance (S212:YES), game stage data of the other club is read (S218), and processing S203–S212 is repeated. It is desirable to set a rhythm pattern so that more difficult operation is required when a game stage advances.

When game stages at all clubs are complete (S212:YES), the probability of the "COOL" display appearing is calculated, and when that probability is high (S213:YES), for example, when COOL probability is 90% or higher, and the score is 3,000 points or more, an opportunity to advance to the "National Contest" is awarded (S214). When this probability is not fulfilled (S213:NO), loop processing returns to the beginning. Processing for the "National Contest" is performed the same as in Steps S203–S213, with the'score being increased and decreased.

However, since the same processing is boring, the electronic game apparatus is constituted so that, in addition to operating in accordance with the example performance, advancement to the next stage is accomplished when a skillful musical arrangement is completed. Consequently, the CPU 21, besides setting icon display timing for the user performance period to an operative period, also sets the intermediate timing and ¼ timing of the icon display interval to an operative period. For example, if the icon display is four bits, operation in time with an 8-bit and 16-bit rhythm is also made operative. A performance corresponding to an interlude or addition, which does not throw the basic rhythm out of tune, is judged to be a skillful performance. In the "National Contest" as well, if performance fails to accord with the rhythm pattern, and the score falls below the reference point, "NUTS" is displayed, and the game ends. The electronic game apparatus is constituted so that even if performance accords with the rhythm pattern, but a musical arrangement is not put together, only points are displayed, and loop processing returns to the beginning. In other words, in "National Contest" processing, the player's musical arrangement capabilities are put to the test.

The electronic game apparatus is constituted so that if the player wins the "National Contest," he can either advance to a stage at the next club, or advance to the "World Championship" (S215). When advancement is to the next club, the game is made even more difficult by being premised on the composition of a musical arrangement. For example, when a skillful musical arrangement is entered, "COOL" is displayed, and when an arrangement is not entered, the stage is concluded with a "NICE" display. To advance to the "World Championship," it is desirable to fulfill even weightier conditions. For example, if the results of the "National Contest" are not in the top 3 for 5 consecutive times, or if the score is not over a fixed level (say, 10,000 points), the right to participation is not granted. For the "World Championship," it is desirable to make the example performance itself more difficult, and to set the degree of difficulty so as to further separate the good players from the not so good players. For example, if an arrangement and example-conforming performance are completed perfectly, "FEVER DJ" is displayed, and if a performance that accords with the example is completed, "LOOKIN' GOOD" is displayed. Furthermore, when "NUTS" is displayed, and when a "National Contest" or "World Championship" is completed, the results thereof are displayed as points, and recorded in RAM 22. The electronic game apparatus is constituted so that this record can be displayed at data display processing (S201). It is desirable that the more this record accumulates, that is, the more experience is built up, the degree of difficulty of a game stage be adjusted upward. The processing order and number of processes of a "National Contest," "World Championship," and club can be changed as deemed appropriate. The game sequence can be set so that it matches up with the unfolding of a story, wherein the player practices dancing at a "club," and then exhibits the results thereof at a "National Contest" and "World Championship."

In accordance with this second aspect, since the electronic game apparatus comprises a rotating dial that imitates a disk jockey-operated turntable, and a constitution that enables the generation of sound, it is possible to provide a mini-game that combines the element of a musical instrument and the element of a game.

Further, in accordance with this second aspect, since an operative period and an inoperative period are provided in time with a rhythm pattern, and processing changes in accordance with which period is in effect, a consistent sense of rhythm is required for operation, and it is possible to provide game-playing heretofore not found in conventional products. Furthermore, in accordance with this second aspect, since the electronic game apparatus is constituted to enable evaluation of operation in accordance with a musical arrangement as an achievement, it is possible to provide novel game-playing to people with musical sense, in addition to conventional game enthusiasts.

Third Aspect

Figure 17:
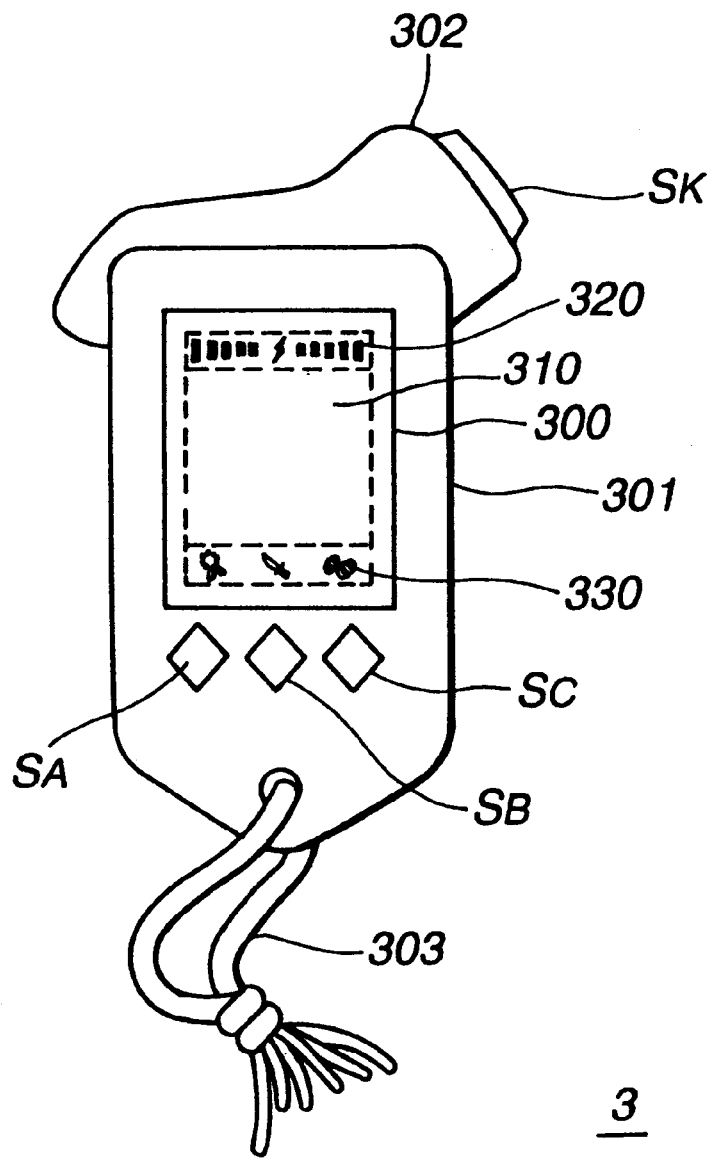
FIG. 17 is a plan view of an electronic game apparatus of a third aspect.

A third aspect of the present invention relates to an electronic game apparatus, which is constituted to enable the notification to the player of the development of a game using vibration means. FIG. 17 shows an oblique view of an electronic game apparatus 3 of this third aspect. The electronic game apparatus 3 of this aspect comprises a display panel 300, operating switches SA, SB, and SC, and a sword switch SK in a body 301. The body 301 is of a shape and size that will fit in the palm of the hand, for example, it is shaped like a pill box, and comprises a tassel 303. The sword switch SK is provided in a protrusion 302 of a shape like the sheath of a sword. The back surface of the body 301 comprises a net mesh structure for transmitting sound generated by a speaker 27 to the outside. The sword switch SK is allocated in game processing as a trigger switch, which is pressed when defeating an "Enemy." The operating switches SA, SB, and SC are allocated for various types of selections and mode changes. Because the sword switch SK, which determines the timing of "swordplay," is provided on the side of the body in a location facing the thumb, it can be operated with an action approximating the downward swing of a real sword, thus making for ease of operation.

Figure 18:
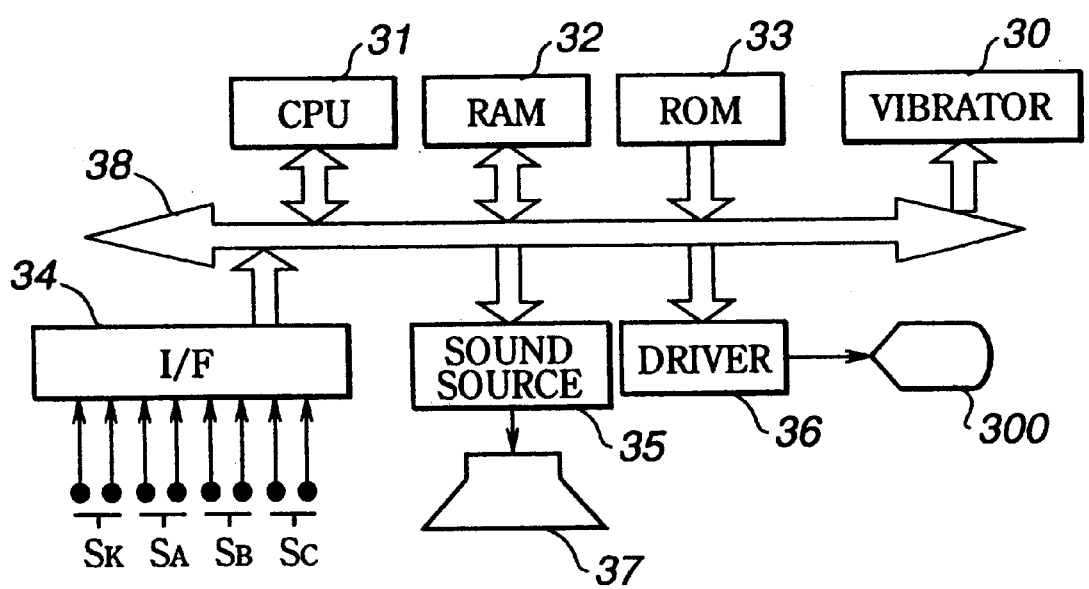
FIG. 18 is a block diagram of a control device in the electronic game apparatus of the third aspect.

FIG. 18 shows a block diagram of a control device of this electronic game apparatus 3. This control device comprises a CPU 31, RAM 32, ROM 33, an interface circuit 34, a sound source circuit 35, a vibrator 30, and a liquid crystal driver 36. The vibrator 30 is vibration means utilized for the vibration mode function of portable telephones and the like, comprises a piezoelectric device and an oscillating circuit, for example, and is constituted to enable vibration in accordance with the application of a drive signal. A description of the CPU 31, RAM 32, ROM 33, sound source circuit 35, liquid crystal driver 36, and speaker 37 is omitted since the constitution thereof is the same as in the above-described first aspect. However, the program data, bit map data, and waveform data stored in ROM 33 are data for this aspect. The interface circuit 34 connects the switches to a bus 38, and is connected to enable reading of the operating states of the operating switches SA, SB and SC, as well as the sword switch.

The display panel 300, as shown in FIG. 20, is divided into a screen area 310, a swordplay level meter 320, and an icon area 330. The screen area 310 is the area which displays a character for game play. The swordplay level meter 320 is a display for indicating the timing for defeating an "Enemy" character when playing the main game. The icon area 330 is the area which displays icons representing various types of game processing modes. When a character is displayed in the screen area 310, the CPU 31 transfers to the display driver 36 the bit map data of the corresponding character from ROM 33. When the swordplay level meter 320 is displayed, the CPU 31 supplies a predetermined code to the display driver 36 while sequentially changing this code. When an icon is displayed in the icon area 330, the CPU 31 transfers to the display driver 36 a predetermined code, which turns ON the bit that lights the icon to be displayed.

Description of Operation

The operation of the game apparatus of this aspect 3 is described next. The game is one in which a character operated by the player undergoes "training" and amasses points which correspond to strength, and on the basis of these points, copes with "Enemy" characters, and "Fate" characters that appear at successive interval in the main game. Victory or defeat is determined by the superiority or inferiority of the timing of the pressing of the sword switch SK. The undergoing of "training," and a constitution that enables the appearance of an "Enemy" character and a "Fate" character to be notified by vibration are the characteristic features of this aspect.

First, the various parameters used in the main game are described.

Hit Point

A hit point determined in advance for each character is set for an "Enemy" character. A hit point is a parameter, which indicates the "life" of an enemy, and the electronic game apparatus is constituted so that when an attack is mounted in accordance with player operation, the hit point decreases. When the hit point reaches zero, the "Enemy" character is treated as having been "defeated." The damage inflicted on an "Enemy" character by a single attack is determined by the hit point decrement, and this decrement is set so that it becomes larger the higher the level.

"Enemy" Characters and "Fate" Characters

The main game is constituted so that a number of types of "Enemy" characters and "Fate" characters make appearances in addition to the player-operated character. An "Enemy" character is one that a player-operated character must defeat, and the type thereof is determined in accordance with a player's level. A "Fate" character is one that determines a player's good fortune or bad fortune, and a plurality of fortunes are determined in accordance with the type of fate. For example, three fate types are provided: a "Child," an "Elder," and a "Girl." The "Fate" characters and the corresponding good fortune and bad fortune set for each character thereof are as shown hereinbelow.

"Fate" Characters and Fortunes

| "Fate" Character | Fortune |
|---|---|
| Crying Child | Good Fortune - Fate points incremented 1 point. |
| | Bad Fortune - Sword is stolen (Attack strength reduced). |
| Elder Carrying a Heavy Load | Good Fortune - Fate points incremented 1 point. |
| | Bad Fortune - Elder turns into God of Death and haunts player-operated character. |
| Cute Girl | Good Fortune - Goddess of Victory increments fate points 1 point. |
| | Bad Fortune - Becomes an encumbrance (Defense strength reduced). |

The larger the number of fate points, the better the "Fate" of a player-operated character. For example, when a player selects "escape," the probability of successfully escaping increases, and the probability of receiving a strong "Sword" from a specific "Fate" character increases. The strength of the "Sword" corresponds to the number of skill points, and is reflected in the intensity of the damage done to an "Enemy" character, that is, it is reflected in an enemy hit point decrement, which decreases in a single attack. Conversely, a decrease in attack strength is reflected in a decrease in the hit point decrement that can be inflicted on an "Enemy" character in a single attack. A decrease in defense strength is reflected in an increase in the decrement of mind points, skill points, and body points, which decrease when attacked by an "Enemy" character.

Levels and Ranks

A rank corresponding to a level is provided to a player-operated character. These levels and ranks can correspond to one another as shown hereinbelow.

Rank-Level Relationship

| Rank | Level |
|---|---|
| Ronin | Level 1–3 |
| Clansman | Level 4, 5 |
| Daimyo | Level 6, 7 |
| Shogun's Retainer | Level 8, 9 |
| Shogun's Vassal | Level 10, 11 |
| Shogun | Level 12 |

At the start of the game, the player's character is set at level 1. It is set so that the level increases 1 point each time an "Enemy" character is defeated. The electronic game apparatus is constituted so a player can execute game play so that he ultimately advances to level 12 and attains the rank of "Shogun."

Attack Patterns and "Fighting Stances"

"Weakness" is set for an "Enemy" character in accordance with the type thereof, and a determination is made concerning a hit point, which is capable of being decreased by an attack pattern in accordance with the "Weakness" thereof. That is, an attack pattern, which inflicts an effective blow, is determined in accordance with an "Enemy" character. Names, such as "Kesagiri," and "Tsubamegaeshi," for example, are determined for attack patterns, together with the levels capable of utilizing these attack patterns. Further, the game is constituted to enable the selection of a "Fighting Stance" for each attack pattern, but a selectable "Fighting Stance" is restricted in accordance with level. For example, the relationship between a selectable "Fighting Stance" and a level is as shown herinbelow.

"Fighting Stance"-Level Relationship

| Fighting Stance | Level |
|---|---|
| High Guard | Level 4 and higher |
| Middle Guard | Level 1 and higher |
| Low Guard | Level 6 or higher |

Figure 19:
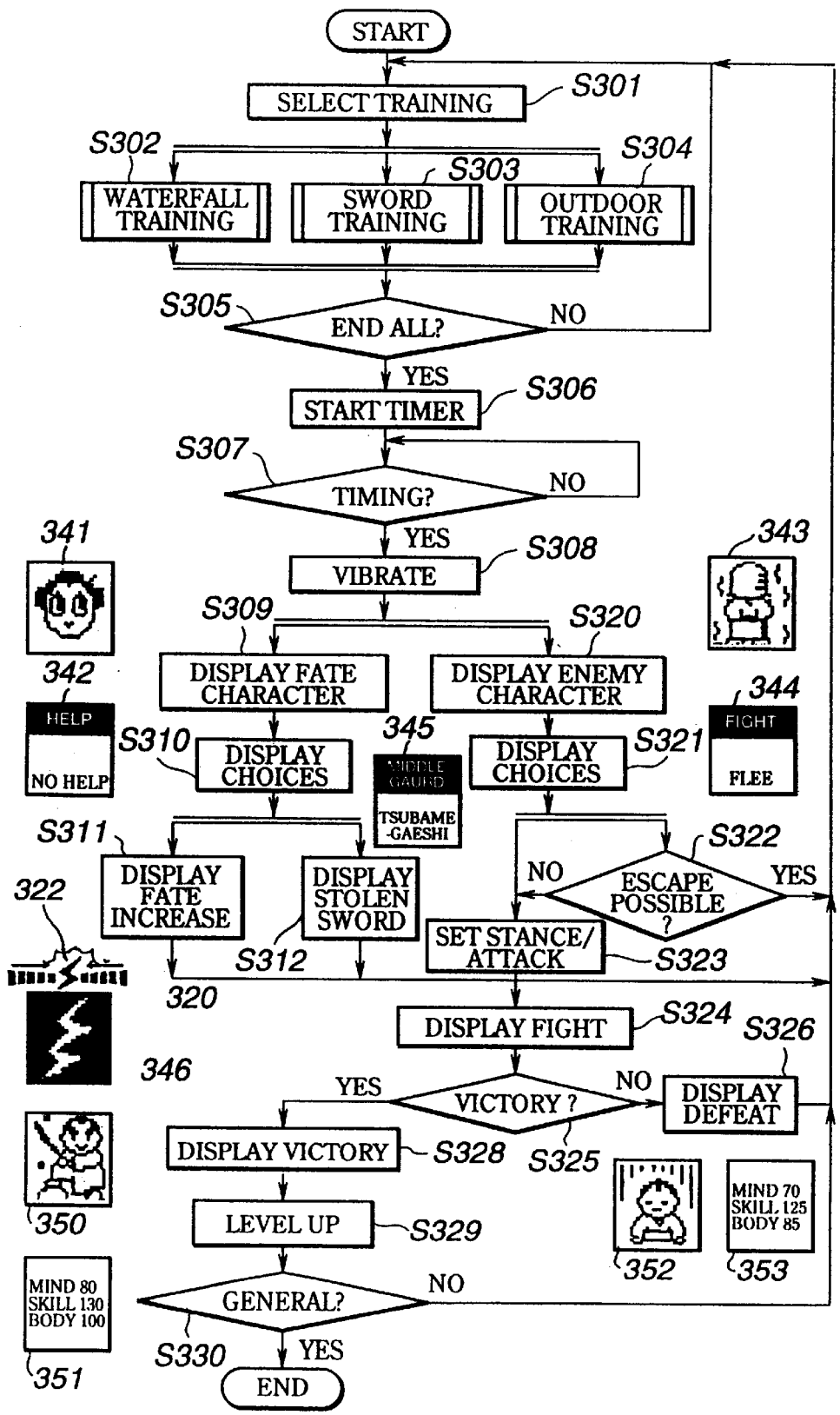
FIG. 19 is a flowchart of processing in the electronic game apparatus of the third aspect.

Game processing of this aspect is described next while referencing the flowchart of FIG. 19. First, a player selects a "Training" mode by pressing one of the operating switches (S301). As shown in FIG. 20, "Training" comprises the modes of "Waterfall Training," which trains the "Mind" (S302); "Sword Training," which-cultivates "Skills" (S303); and "Outdoor Training," which disciplines the "Body" (S304). When these training modes are selected, mind points, skill points, and body points are adjusted.

Figure 21:
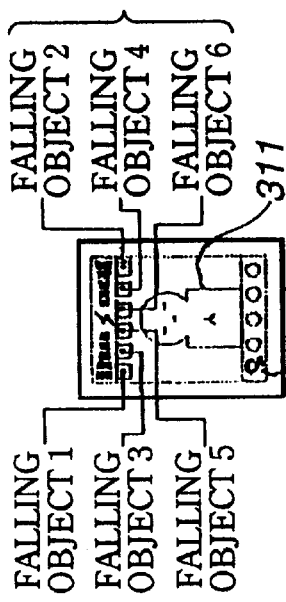
FIG. 21 are illustrations and explanations of the processing of "Waterfall Training" (mind game)

Mind points, which are increased and decreased by "Waterfall Training" (S302), are reflected in the quickness of a character's movements. In this mode, a mind icon 331 is displayed in the icon area 330, and a character 311, which appears to be undergoing "Waterfall Training," is displayed in the screen area 310. As shown in FIG. 21, for this "waterfall Training," there is provided a game, in which a player operates the operating switches to move a character 311 out of the way of a falling object 314 so it does not hit the character 311. The CPU 31 displays a falling object 314 at the top of the screen area 310, and causes it to move (fall) toward the bottom of the screen. The player operates operating switches SA and SB, moves the character 311 left and right, and avoids a falling object 314. When a falling object 314 hits the character 311, the number of errors is calculated. When a fixed period of time (for example, 20 seconds) elapses, the CPU 31 adds up mind points in accordance with the number of errors. For example, if the character avoids all the falling objects and is not hit, 3 points are added, if there is 1 error, 2 points are added, and if there are 2 errors, 1 point is added. That is, 1 point is subtracted when there is 1 error. Processing is performed so that if there are 3 or more errors, the game ends without advancing to the main game.

Figure 22:
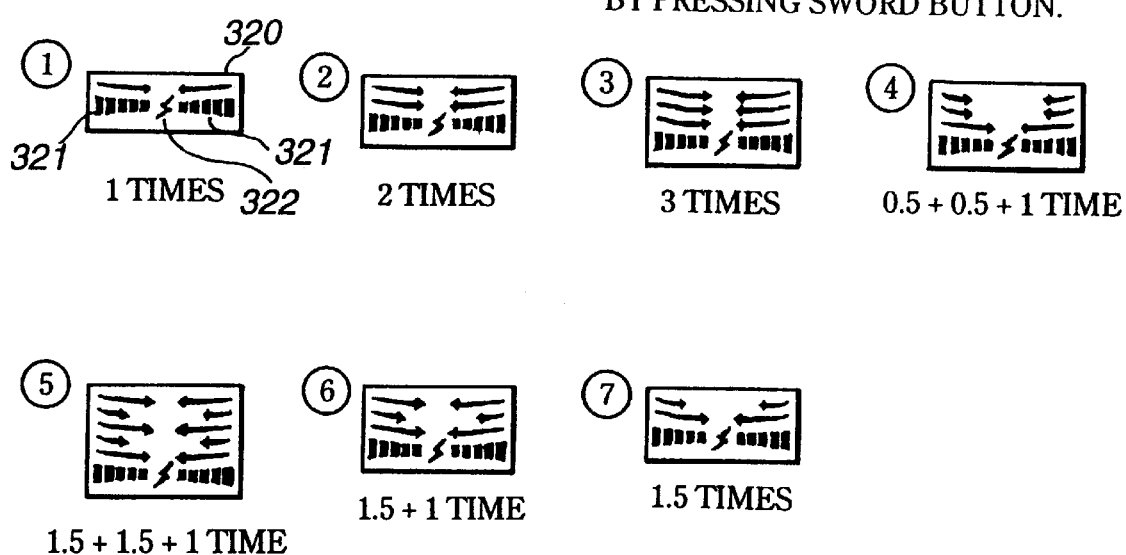
FIG. 22 are illustrations and explanations of the processing of "Sword Training" (skill game)

Skill points, which are increased and decreased by "Sword Training" (S303), are reflected in the intensity of attack strength relative to an "Enemy" character. In this mode, a skill icon 332 is displayed in the icon area 330, and a character 312, which appears to be undergoing "Sword Training," is displayed in the screen area 310. As shown in FIG. 22, for this "Sword Training," there is provided a game, in which a player presses the sword switch SK at the timing at which an attack icon 322 is displayed correspondent to timing displayed in the swordplay level meter 320. The CPU 31 sequentially supplies a predetermined code to the display device 36 at each fixed timing. The attack icon is not displayed by these codes. A meter display is performed in accordance with these codes, so that an indicator 321 steadily extends toward the center from the left and right. The CPU 31 sets the display period of the indicator 321 to an inoperative period, and sets a predetermined period, which is based on the display timing of the attack icon 322, to an operative period. The CPU 31 determines whether the timing at which the sword switch SK is operated falls within the operative period, or falls within the inoperative period. If the sword switch SK is pressed in the operative period, it is treated as a hit, and if it is pressed in the inoperative period, it is treated as a miss. Various display patterns are provided, as shown in FIG. 22. Since there are also times when the attack icon 322 is not displayed subsequent to the indicator 321 being displayed (shown in the figure as 0.5), it is not easy to achieve a hit. Since 3 patterns determined at random from among the seven display patterns shown in FIG. 22 are displayed, it is difficult for a player to predict the timing of a display pattern. After a fixed period (20 seconds, for example) has elapsed, the CPU 31 increases or decreases skill points in accordance with the operating status. For example, if 3 hits are achieved during 3 display pattern operations, 3 points are added, if there is 1 miss, 2 points are added, and if there are 2 misses, 1 point is added. That is, if a player misses one time, 1 point is subtracted. If a player misses 3 times or more, processing is performed so that the game ends without advancing to the main game.

Figure 23:
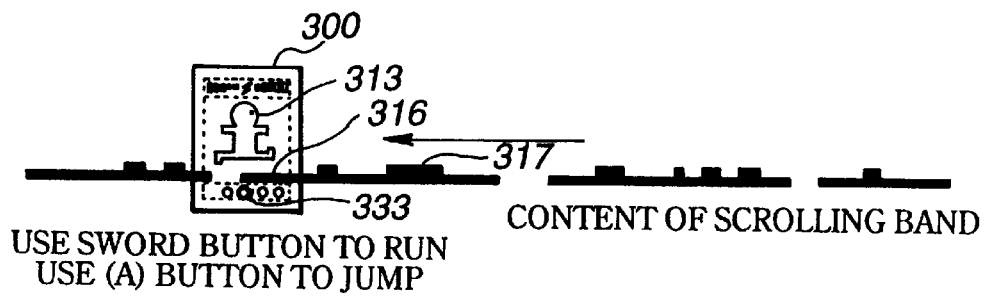
FIG. 23 are illustrations and explanations of the processing of "Outdoor Training" (body game)

Body points, which are increased and decreased by "Outdoor Training" (S304), are reflected in the defense capabilities of a character in the main game. In this mode, a body icon 333 is displayed in the icon area 330, and a character 313, which appears to be undergoing "Outdoor Training," is displayed in the screen area 310. As shown in FIG. 23, for this "Outdoor Training," there is provided a game, in which the player operates the operating switches so that the character 313 avoids running into obstacles 316 and 317. The CPU 31 displays the obstacles 316 and 317 by scrolling them along the bottom of the screen area 310. The player makes the character 313 jump with operating switch SA, and makes the character 313 run with the sword switch SK (increases the scrolling speed). When the character 313 runs into obstacle 316 and 317, the number of errors is calculated. When a fixed period (20 seconds, for example) elapses, the CPU 31 adds up the body points in accordance with the number of errors. For example, when all of the obstacles have been jumped over, passed under or otherwise negotiated without being hit, 3 points is added, when an error occurs 1 time, 2 points are added, and when an error occurs 2 times, 1 point is added. That is, 1 point is subtracted each time an error occurs. When an error occurs 3 or more times, processing is performed so that the game ends without advancing to the main game. Points accumulated by the above-described "Training" constitute the fundamental capabilities for a player to execute a game in the main game. The electronic game apparatus is set up so that a player will not be able to complete the game unless he performs this "Training" process once a day.

Now, when all of the above-described training is complete (S305:YES), the total points obtained in accordance with training are displayed, and the main game starts. The CPU 31 starts the internal timer (S306). This timer notifies the CPU 31 of operation timing when a fixed period of time elapses. There are instances when operation timing is not notified for several hours (S307:NO), and there are instances when operation timing is notified at short intervals. Naturally, operation timing can also be determined in accordance with a random number or the like. That is, the electronic game apparatus can comprise a constitution that enables the determination of operation timing that cannot be predicted by a player. Operation timing signifies the appearance of "Enemy" characters, and "Fatea" characters.

When operation timing is notified (S307:YES), the CPU 31 supplies a drive signal to the vibrator 30 (S308). The vibrator 30 vibrates in accordance therewith, and alerts the player carrying the portable game apparatus 3 of the appearance of an "Enemy" character, or a "Fate" character. Whether an "Enemy" character appears, or whether a "Fate" character appears is determined by a random number or the like.

When an "Fate" character is to make an appearance, the CPU 31 displays a "Fate" character. The determination as to whether the "Child," "Elder," or "Girl" will appear as the "Fate" character is made by a random number. In FIG. 19, the "Fate" character of the "Girl" 341 is displayed. Next, a choice is displayed (S310). In FIG. 19, two choices are displayed: "Help" and "No Help." Switching the selection status of the choice is performed by pressing operating switch SA, and determination thereof is performed by pressing operating switch SB. Whichever choice is selected, the determination as to whether it will become "Good Fortune," or whether it will become "Bad Fortune" is also made by a random number. Therefore, if the player does not make a selection, game processing will not be able to predict what will happen. As a result of the selection, if it is determined that "Good Fortune" will occur, the CPU 31 displays an indication that fortunes will go up, and fate points are incremented 1 point (S311). Conversely, if it is determined that "Bad Fortune" will occur, the CPU 31 displays the contents corresponding to the "Fate" character thereof. For example, if it is the "Girl" character, a display to the effect "She will become an encumbrance" is shown, if it is the "Child" character, a display to the effect "Sword was stolen" is shown, and if it is the "Elder" character, a display to the effect "He has become the God of Death" is shown (S312). And then, "Training" processing (S301-) is repeated once again. Furthermore, the electronic game apparatus is set up so that when fate points reach a fixed number or higher, for example, 3 or more points, it becomes possible to use a "Deathblow Technique" that enables a player-operated character to "Defeat" an "Enemy" character with a single attack no matter what hit point the "Enemy" character possesses. This "Deathblow Technique" is included in the selection of a "Fighting Stance" and attack pattern setting (S323). Further, there are instances when the power of the sword changes when a "Fate" character appears. When "Sword was stolen" is displayed, attack capabilities decrease, and when "Received a strong sword" is displayed, attack capabilities go up.

When an "Enemy" character appears at operation timing (S307:YES), the CPU 31 displays an "Enemy" character 343 (S320). A plurality of types of "Enemy" characters are provided in accordance with the level. The determination as to which "Enemy" character appears is made in accordance with a random number. Next, a choice is displayed (S321). In FIG. 19, a choice 344 of "Fight" or "Flee" is displayed. When a player selects "Flee," a determination is made as to whether or not the player-operated character can escape. Whether or not escape is possible is determined by the number of fate points at that time. When the number of fate points is lower than the reference point, processing is performed so that escape is not possible (S322:NO). When the number of fate points is higher than the reference point, processing is performed so that escape is possible (S322:YES).

When escape is impossible (S322:NO), and when "Fight" is selected from the choices given, a choice 345 for selecting a "Fighting Stance" and attack pattern is displayed (S323). The "Fighting Stance" displayed here is determined in accordance with the level at that time, as described above. As for the attack pattern, the player selects a pattern that is effective against the "Enemy" character. A player proficient at this game will select this attack pattern in accordance with experience. Even a choice that is not displayed on the display panel 300 will be displayed if operating switch SA is pressed continually. When a "Fighting Stance" and attack pattern have been selected, a fight display appears (S324). That is, the CPU 31 displays in the swordplay level meter 320 the timing of an attack using one of the patterns of FIG. 22. Pattern selection is performed in accordance with a random number.

The player presses the sword switch SK in time with the display of the attack timing icon 322, while watching the swordplay level meter 320. A display 346 to the effect that an attack was made is shown in the screen area 310. If operation is not performed in the operative period set by the CPU 31 (S325:NO), it is treated as though the player-operated character was attacked by the "Enemy" character and lost (S326). That is, a character 352, which indicates that the player-operated character lost, is displayed, and mind points, skill points, and body points are all decreased in accordance with the enemy's hit point. Then, post-decrement points are displayed (353), and programming returns to "Training" processing. Conversely, when the sword switch SK is operated in the operative period set by the CPU 31 (S325:YES), it is treated as though the player-operated character attacked the "Enemy" character and won. That is, a character 350, which indicates that the player-operated character won, is displayed, and mind points, skill points, and body points are all incremented in accordance with the enemy's hit point. Further, the "Enemy" character's hit point is decreased. The extent of the decrease corresponds to the attack capabilities set at that time, that is, to the skill points. When, as a result of decreasing a hit point, an "Enemy" character's hit point reaches zero, the "Enemy" character is treated as being "Dead." That is, the game is set so that the "Enemy" character is not displayed thereafter, and the level of the player-operated character is raised 1 level (S329). Then, in accordance with the level being raised, if it is determined that the player-operated character has been "Promoted" to a new rank in accordance with the above-described correspondent relationship, a character of a new rank is displayed. If the new rank has yet to reach "Shogun" (S330:NO), "Training" processing is repeated once again. If the new rank has reached "Shogun" (S330:YES), the game ends successfully.

As described above, the main game continues on until the game is over. However, there are instances when the player does not want to play the game anymore, and when lots of points are lost and the game does not move to "Training" processing right away. The game is constituted so that at times such as this, the player can operate the operating switches, and enter a special mode such as that shown in FIG. 24. For example, when the player wants to go to bed, or stop the game temporarily, he selects the "Inn" mode. When this mode is selected, an "Inn" display 360 appears on the display panel 300. Then, the progress of the game halts, and the vibrator does not vibrate until the "Inn" mode is canceled once again. When the player wants to raise his body points temporarily, he selects the "Provisions" mode. When this mode is selected, a "Food" display 370 appears. Using the operating-switch here, it is possible to increase body points by selecting either a "Riceball" icon 371, or a "Green Tea" icon 372. Further, when the player-operated character has been damaged by an "Enemy" character attack, it is possible to increase mind points, skill points, and body points a little by selecting an "Infirmary" mode. When this mode is selected, an "Infirmary" display 380 appears. And to abruptly increase mind points, skill points, and body points, a "Dojo Challenge" mode can also be selected. When this mode is selected, victory or defeat is determined by a random number. If victorious, a victory character 350 is displayed, and mind points, skill points, and body points can be increased in a single operation. However, if defeated, mind points, skill points, and body points are abruptly lost. That is, an adventurous point gamble is provided at great risk to the player.

Embodiment

Figure 26:
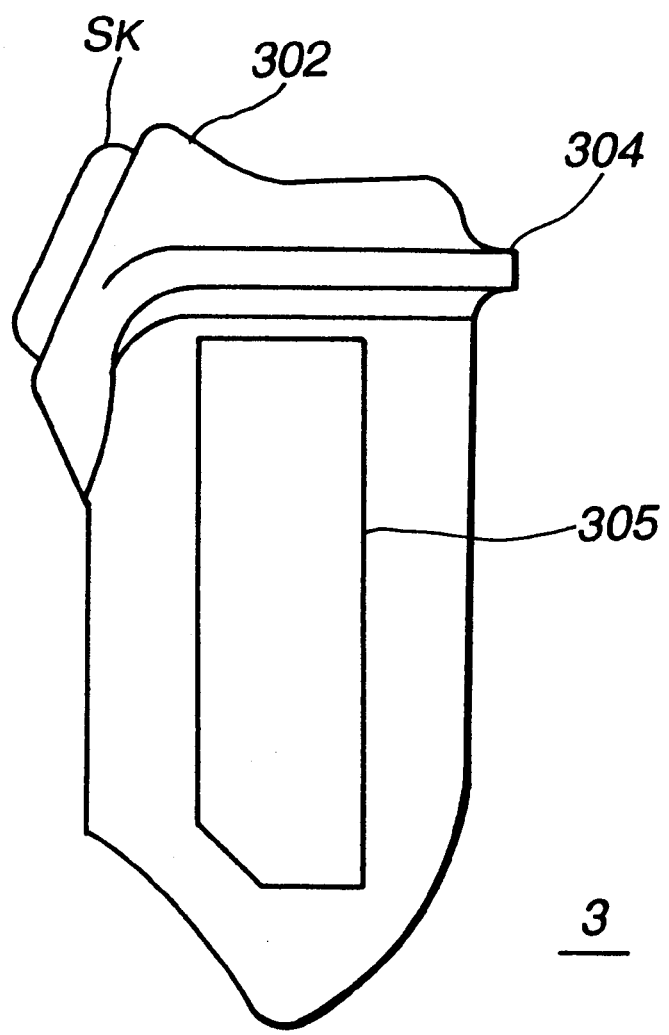
FIG. 26 is a rear view of the embodiment of the third aspect.

FIG. 25 through FIG. 27 show external views of the embodiment of an electronic game apparatus of this third aspect. In FIG. 25, there is (a) a front view, (b) a left side view, (c) a right side view, (d) a plan view, and (e) a bottom view. And FIG. 26 is a rear view. In FIG. 17, the external shape of the game apparatus was likened to the shape of a "pillbox," but the electronic game apparatus of this embodiment is formed in the shape of a deformed sword. Thus, the main body 301 constitutes the blade portion, and the bottom is slightly pointed. Meanwhile, a sword guard 304 is attached, and a switch SK is provided on the grip portion. In FIG. 27, a battery cover 305 is secured in a freely opening-and-closing manner, and the inside is designed so as to be able to house one AAA battery. Furthermore, FIG. 27 shows schematics of the inside of the electronic game apparatus of the third aspect. In FIG. 27, (a) is an A—A cross-sectional view of FIGS. 25 (a), (b) is a B—B cross-sectional view FIGS. 25 (a), (c) is a front view of the inside when the top cover is removed, (d) is a rear view when the battery cover is removed, and (e) is a diagram schematically showing the location of the battery. The electronic game apparatus of this embodiment is constituted to be able to be split in half, and when the front side cover is removed, the inside can be observed as in (c). Control circuit elements are mounted on a substrate 307. The display panel 300 and speaker 37 are also mounted on the substrate. And on the inside of the battery cover 305 is a battery compartment 306.

In accordance with the third aspect, since the electronic game apparatus comprises a vibrator, which vibrates the body in line with the appearance of a predetermined character, it is possible to provide an electronic game apparatus capable of using vibrations to alert a player of an operation time. Therefore, it becomes possible for a player to play a game without choosing the time, enabling the provision of game play that continues on for several days.

Further, in accordance with this aspect, since the electronic game apparatus is constituted to enable the increase and decrease, via a subordinate game called "Training," of points, which determine the action of a character that moves in accordance with operation, it is possible to provide a novel and interesting electronic game apparatus unlike any heretofore conventional product.

Further, since the electronic game apparatus is constituted to provide a "Fate" character in addition to an "Enemy" character, and to enable the increase and decrease of fate points, which affect the direction of a game, it is possible to provide interesting game play, in which there is provided an unpredictable game development, which is independent of the unskilled operation of a player.

Fourth Aspect

Figure 28:
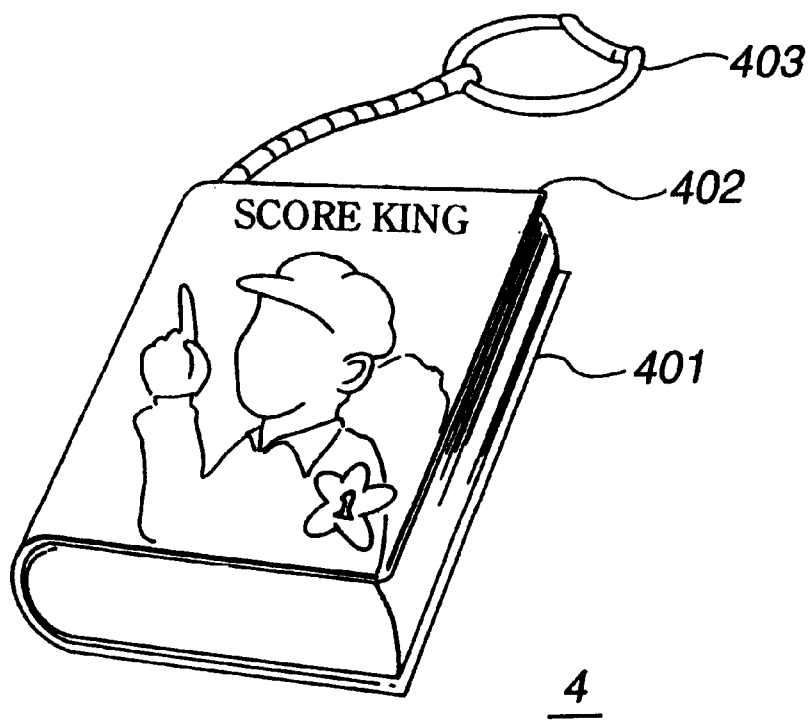
FIG. 28 is an oblique view of an electronic game apparatus of a fourth aspect.
Figure 29:
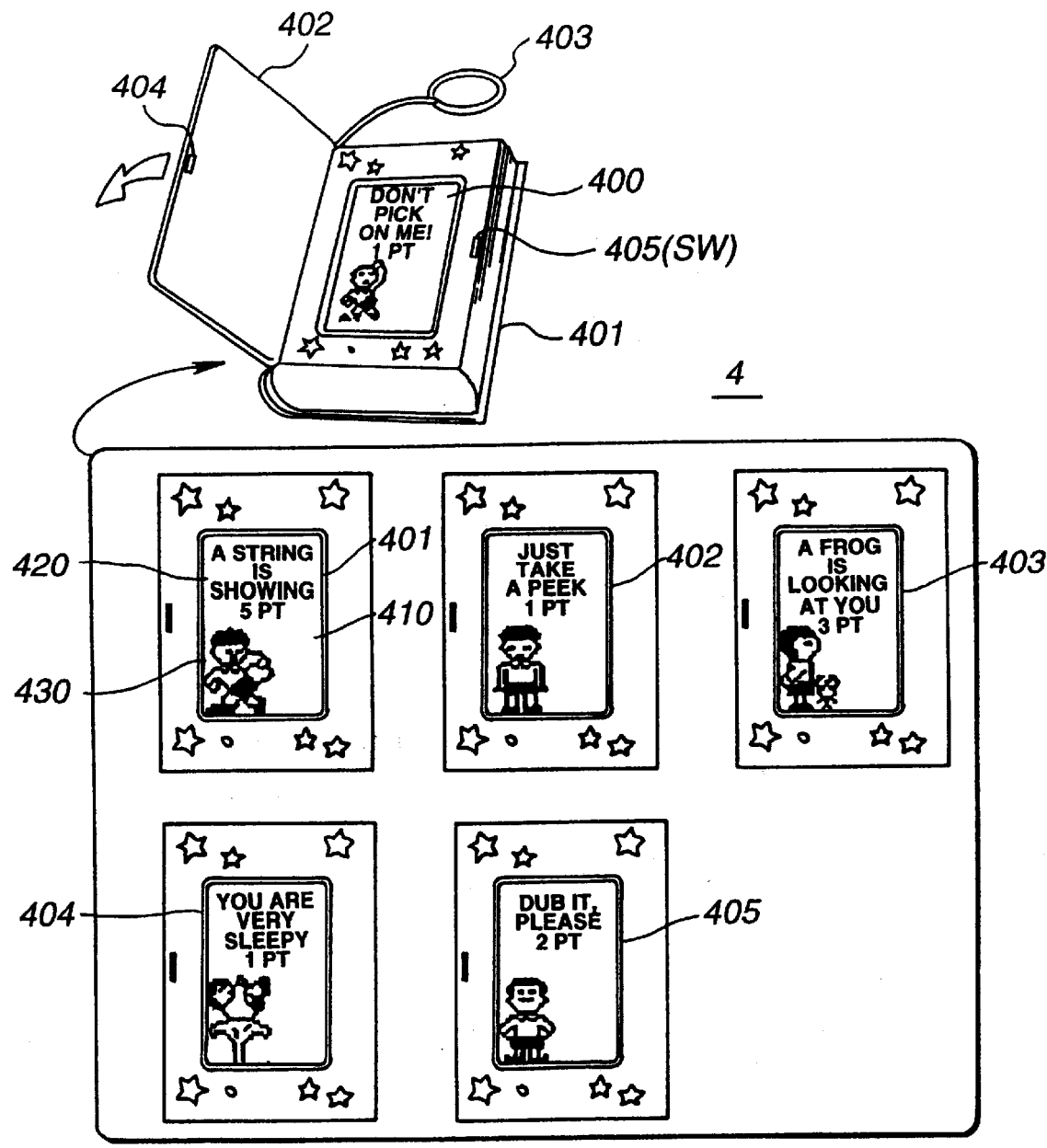
FIG. 29 are examples of display images and an oblique view of the electronic game apparatus of the fourth aspect when the cover is open.

A fourth aspect of the present invention provides a new mini-game by applying nostalgic fortune-telling cards to an electronic game apparatus. FIG. 28 shows an oblique view of a electronic game apparatus of this fourth aspect. FIG. 29 shows an oblique view of when the cover is open, and display patterns of the display panel. The electronic game apparatus 4 of this aspect comprises a body 401, a cover 402, and a keyholder 403. The body 401 is of a size and shape that fits in the palm of the hand, and, for example, is shaped like a thick comic book. On the inside, a control device like that shown in FIG. 30 can be incorporated. The cover 402 is secured to the body 401 in a freely opening-and-closing manner, and is used as both a cover for the display panel 400, and a switch pressing means. When the cover 402 is open, the body 401 side is comprised of a display panel 400 as shown in FIG. 29. A protrusion 404 is provided at the edge portion of the cover 402, and, when the cover 402 is closed, is constituted so as to be able to fit into a switch hole 405 provided on the body 401 side. A switch SW is provided inside the switch hole 405, making it possible to shut the switch OFF when the protrusion 404 is fitted thereinto, and to turn the switch ON when the protrusion 404 is not fitted thereinto. That is, when the cover 402 is closed, the switch SW is OFF, and when the cover 402 is open, the switch SW is ON.

Figure 30:
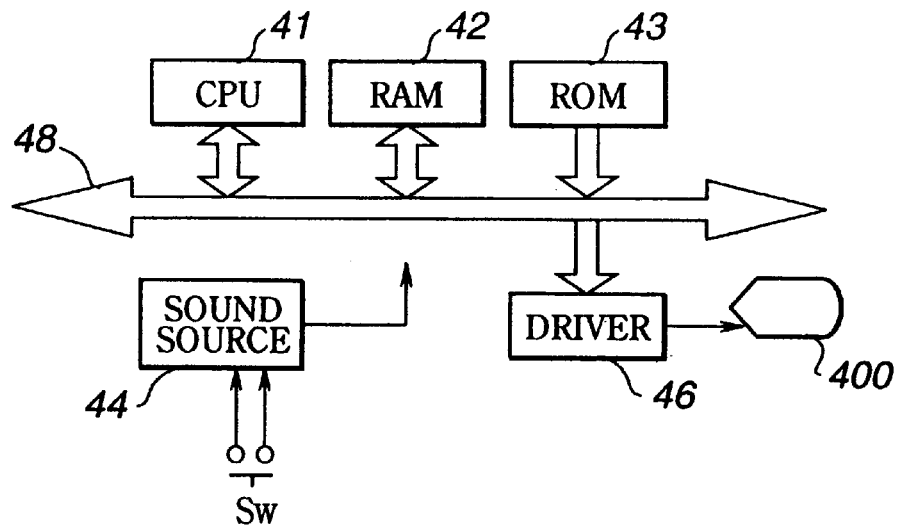
FIG. 30 is a block diagram of a control device in the electronic game apparatus of the fourth aspect.

The display panel 400, as shown in FIG. 29, comprises a plurality of display areas: a message display area 410, a point display area 420, and a character display area 430. FIG. 30. shows a block diagram of a control device of this electronic game apparatus 4. This control device comprises a CPU 41, RAM 42, ROM 43, liquid crystal drive 46, and power source circuit 44. The power source circuit 44 is constituted so as to be able to supply power to this control device, and power is supplied when the switch SW is ON, and the power supply is stopped when the switch SW is OFF. A description of the CPU 41, RAM 42, ROM 43, and liquid crystal driver 46 is omitted since the constitution thereof is the same as in the above-described first aspect. However, the program data and bit map data stored in ROM 43 are data for this aspect. The bit map data for displaying various images like those shown in FIG. 29 in particular are each stored corresponding to a number from 1 to 5.

Description of Operation

Figure 31:
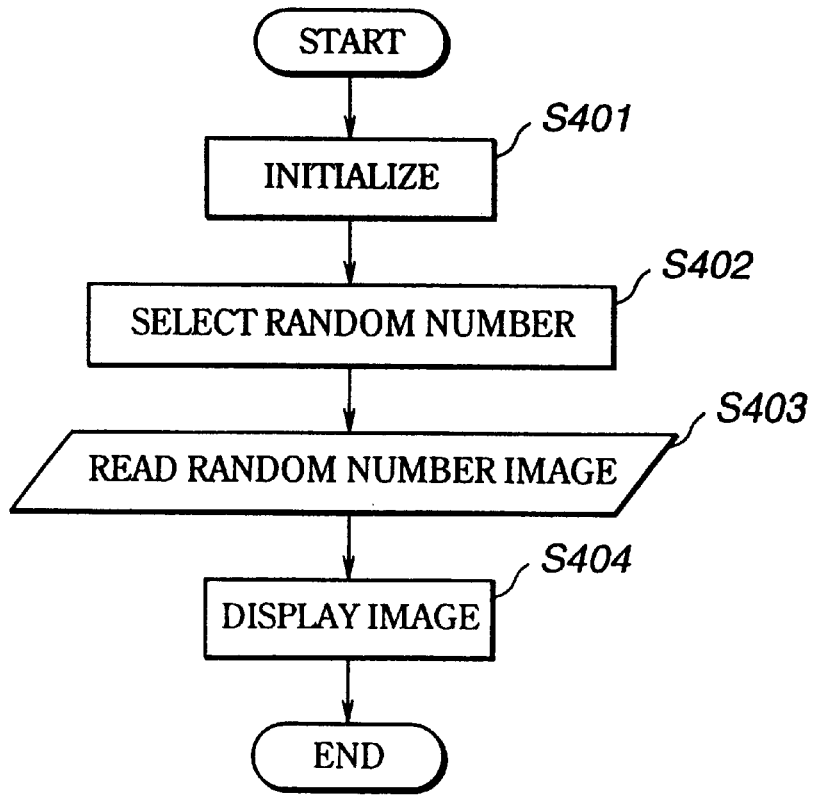
FIG. 31 is a flowchart of processing in the electronic game apparatus of the fourth aspect.

The operation of this aspect is described next by referring to the flowchart of FIG. 31. With this electronic game apparatus 4, power is supplied to the control device only when the cover 402 is open. In the initial state in which power is ON, the CPU 41 reads program data from microprocessor-specific addresses on ROM 43. That is, the electronic game apparatus is constituted to enable operation to stop when a player closes the cover 402, and to implement a program from the initial state each time the cover 402 is opened. In the initial state, the RAM 42 operation area is cleared, and the display device 46 is initialized (S401). Next, CPU 41 performs random number computations, and calculates an arbitrary number from 1 to 5 (S402). Then, the CPU 41 reads from ROM 43 bit map data corresponding to the calculated number, and transfers it to the display device 46 (S403). The display device 46 displays an image corresponding to this bit map data on the display panel 400 (S404).

In the image in accordance with the bit map data stored in ROM 43, as can be seen from FIG. 29, there are displayed a meaningless message, and points that are unrelated to the contents of the message. Since a new random number computation is made, and an arbitrary image is displayed each time a player opens the cover 402, this game falls into the fortune-telling card category, in which cards, containing what might be called nonsense messages, are flipped over. A player enjoys these nonsense messages and the meaninglessness of the points. Furthermore, a type of game is possible wherein a player competes with a playmate by taking turns opening the cover, and totaling the displayed points after a fixed number of times (10 times, for example) to see who has the most points.

Embodiment

Figures 33A, 33B:
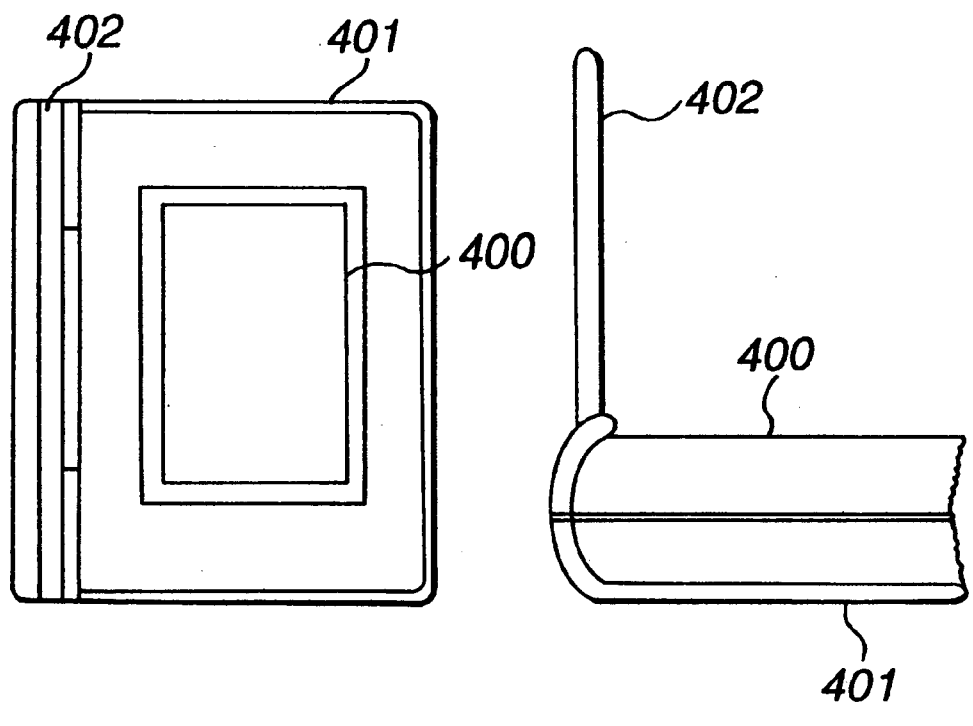
FIG. 33 are external views of the embodiment of the fourth aspect when the cover is open, with (a) being a front view, and (b) a bottom view (symmetrical to a plan view)

FIG. 32 and FIG. 33 show external views of the embodiment of the electronic game apparatus of this fourth aspect. In FIG. 32, (a) is a front view, (b) is a rear view, (c) is a right side view, (d) is a left side view, (e) is a bottom view (symmetrical to plan view), (f) is a cross-sectional view of an A—A cross section of (a), and (g) is an enlarged view of the vicinity of the right side of the bottom view. Further, FIG. 33 shows external views of the state, in which the cover of this electronic game apparatus is open, with (a) being a front view, and (b) being a bottom view (symmetrical to plan view). As can be seen from the cross-section view of (f), the display panel 400 is mounted on a substrate 406. The backside of the substrate 406 comprises, for example, a mercury battery or other such power source 44 and a speaker SP. When a speaker is provided in this manner, in the control device of FIG. 30, the speaker SP is connected to the bus via a simple oscillation circuit. Then, if the electronic game apparatus is constituted so that "pipi" or some other tone is emitted either in accordance with the display content, or each time the cover 402 is opened, the game can be made even more interesting. As described above, in accordance with this fourth aspect, it is possible to provide an ingenuous game that portrays nostalgic fortune-telling cards and written oracles.

Moreover, because the game apparatus of this aspect need only ensure sufficient display panel area, it can be manufactured in a fairly compact shape. Moreover, since operation enters a stop state once an image is displayed, and since power is cut off while the cover is closed, the electronic game apparatus of this aspect has the advantage of consuming less power than other mini-games, and can be played semi-permanently.

Fifth Aspect

Figure 34:
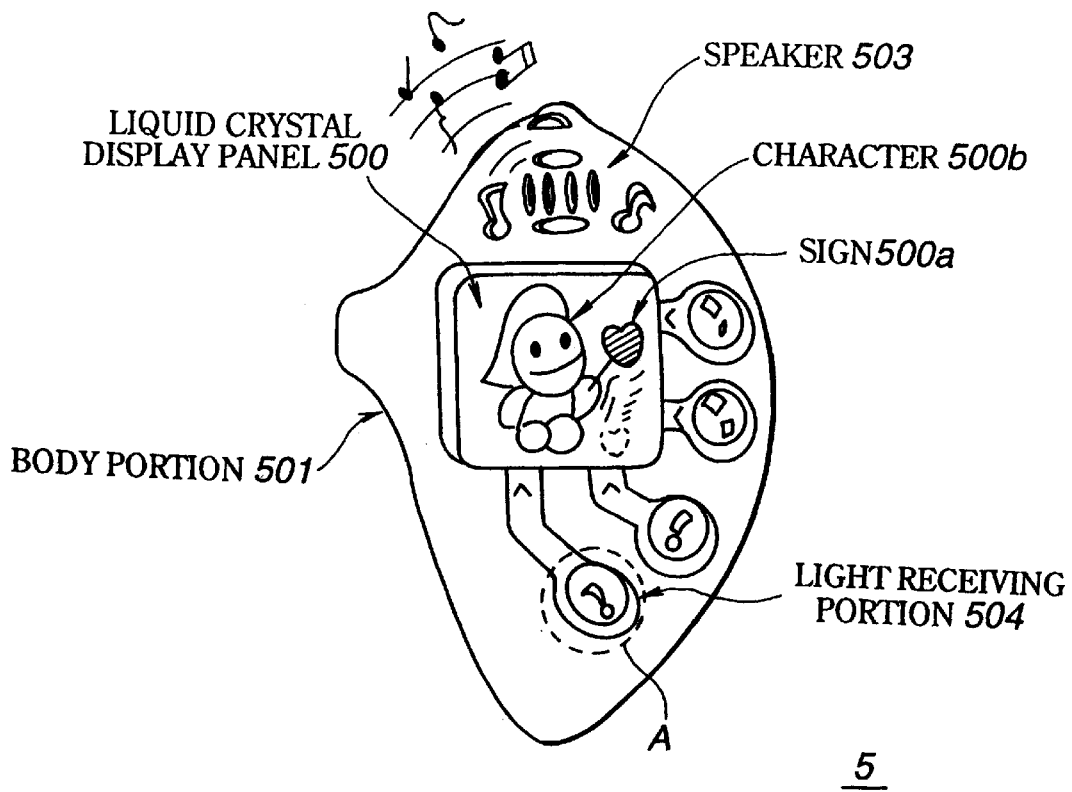
FIG. 34 is a front view of an electronic game apparatus of a fifth aspect.

FIG. 34 is a front view of an electronic game apparatus 5 of a fifth aspect of the present invention. This electronic game apparatus 5 is made compact for portability, and, for example, is shaped like an ocarina (antler flute). However, the electronic game apparatus of the present invention is not limited to such a compact size, and, for example, can also be of a size similar to a stationary type, and the shape thereof is also not limited to the shape described in this aspect. The main body portion 501, as shown in FIG. 34, is provided with a liquid crystal display panel 500, which is the display portion, a speaker 503, and a plurality of light receiving portions 504. A light receiving device, which is described below, is built into this light receiving portion 504, and a sound is generated in accordance with the amount of light this light receiving device detects. More specifically, when a player covers a light receiving portion 504 with a finger or the like, the light incident on the light receiving portion 504 is shut out, and the amount of light detected by the built-in light receiving device changes. Then, the electronic game apparatus related to this aspect is constituted so that a different frequency sound is generated for each light receiving portion 504 thereof in accordance with the amount of light detected by this light receiving device.

Figure 35:
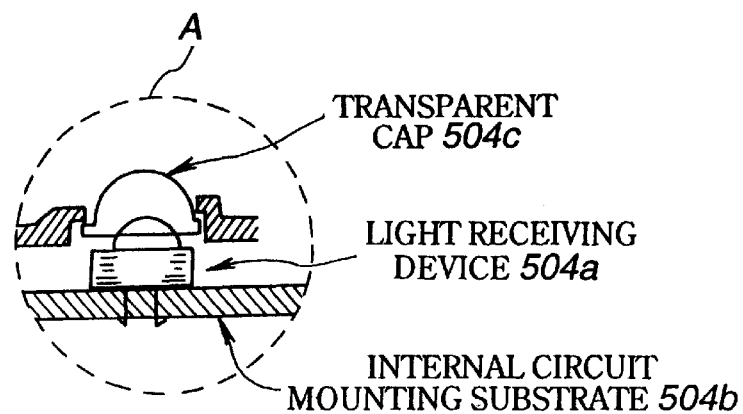
FIG. 35 is an enlarged cross-sectional view of a light receiving portion.

FIG. 35 is an enlarged cross-sectional view of a light receiving portion 504. In accordance with FIG. 35, a light receiving portion 504 is provided with a light receiving device (a phototransistor, for example) 504a, which generates a charge when light is received. And then the light receiving device 504a is arranged on an internal circuit mounting substrate 504b, and is connected to internal circuitry shown in FIG. 36 described hereinbelow. Furthermore, a transparent cap 504c is arranged above the light receiving device 504a, and covers the light receiving portion 504. Therefore, light enters through the transparent cap 504c, and the incident light is detected by the light receiving device 504a.

Figure 36:
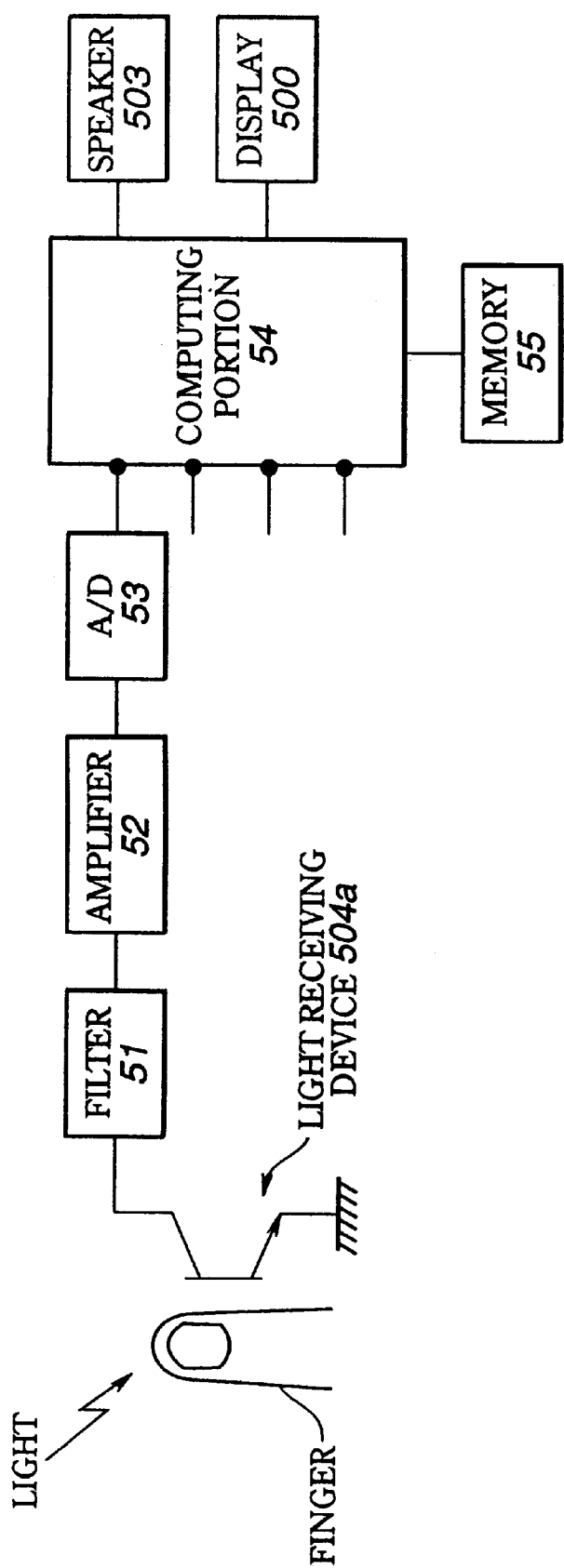
FIG. 36 is a block diagram of a first example of connections for a light receiving element.

FIG. 36 shows a rough diagram of a first example of internal circuitry to which a light receiving device 504a is connected. In this internal circuitry, an electric charge is generated in accordance with the reception of light by a light receiving device 504a, and a current, that is, an analog signal flows within the circuitry. This analog signal passes through a filter 51 for removing the noise constituents of a predetermined frequency, and is amplified to a predetermined amplification factor by an amplifier portion 52. Furthermore, the analog signal is converted into a digital value in accordance with the voltage value thereof by an A/D converter 53. The amount of the electric charge generated in accordance with the light received by the light receiving device 504a at this time depends on the amount of light received by the light receiving device 504a.

Therefore, for example, if the transparent cap 504c is completely covered by a finger or the like, and light is completely shut out, since the light receiving device 504a will not detect any light, a current does not flow in the internal circuitry. Conversely, when the transparent cap 504c is not completely covered by a finger, leaving a small space open through which light can enter, an electric charge of an amount that accords with the amount of light received is generated. Consequently, the digital value of the digital signal converted by the A/D converter 53 is converted to a value corresponding to the voltage of the analog signal that accords with the electric charge amount thereof. In this aspect, since the constitution is such that a sound is generated when a light receiving device is shut off from the light, the converted digital value is set to be greater the smaller the analog signal voltage.

The converted digital signal is inputted into an computing portion 54. The computing portion 54 is an MPU (microprocessor unit) of a microcomputer, for example, and digital signals corresponding to a plurality of light receiving devices 504a, respectively, are inputted into the computing portion 54 via an interface circuit (not shown). Further, memory 55 is the ROM of the microcomputer, and has stored therein a computer program for generating a different sound in accordance with a digital signal that is inputted into the above-mentioned computing portion 54. That is, when a digital signal corresponding to any of a plurality of light receiving portions 504 is inputted, the computing portion 54 generates a sound of a frequency corresponding to that light receiving portion 504 in accordance with the above-mentioned program. Then, the sound thereof is outputted from a speaker 503. Further, the electronic game apparatus 5 of this aspect, as is described hereinbelow, comprises a display portion 500 (a liquid crystal display panel, for example) for displaying a predetermined image based on the control of the computing portion 54.

Thus, in the electronic game apparatus 5 of this aspect, it is possible to adjust the intensity of the generated sound in accordance with the digital value of the digital signal. More specifically, the electronic game apparatus 5 of this aspect is set up so that when a transparent cap 504c is covered by a finger or the like, the larger the covered portion thereof (area), the smaller the light received by the light receiving device 504a and the greater the intensity of the sound. Furthermore, when a transparent cap 504c is completely covered, and light is shut out completely, the intensity of the generated sound reaches the maximum.

In an electronic game apparatus of a constitution such as this, it is possible for a player to generate a desired sound by covering the surface of an arbitrary light receiving portion 504, that is, the transparent cap 504c, with a finger or the like, and shutting out the light incident on the light receiving device 504a. Therefore, a player can perform a predetermined scale by consecutively covering a plurality of transparent caps with a finger.

Furthermore, it is possible to adjust the intensity of a sound to be generated by adjusting the location of the finger on the transparent cap 504c, and changing the amount of light entering from the transparent cap 504c, that is, the amount of light, which the light receiving device 504a receives.

Figure 37:
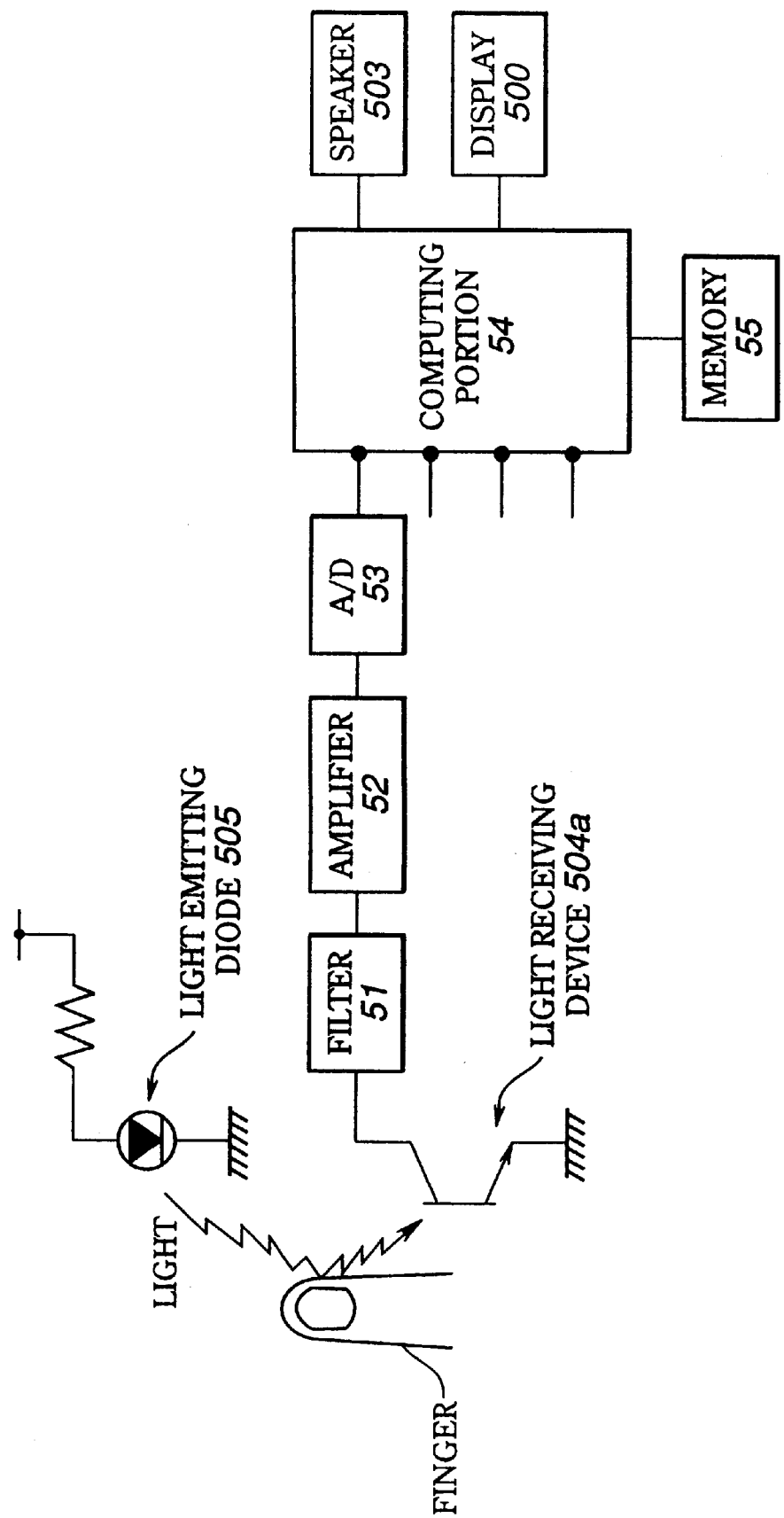
FIG. 37 is a block diagram of a second example of the connections for a light receiving element.

FIG. 37 is a diagram showing a second example of an internal circuitry of a light receiving portion 504. In accordance with FIG. 37, a light receiving portion 504 has a light emitting portion 505, such as a light emitting diode, on the inside thereof. Then, by covering a light receiving portion 504 with a finger or the like, and causing the light from a light emitting portion 505 in the area covered thereby to be reflected onto a light receiving device 504a, causes the light thereof to be received by the light receiving device 504a. When the light receiving device 504a detects a light, a sound is generated by an computing portion 54 in accordance with that light receiving portion 504a based on a predetermined program stored in memory 55, just like described above. Further, the intensity of the generated sound is also, adjusted in accordance with the area of the light receiving portion 504 covered by a finger or the like, exactly as described above.

However, when playing a scale using the above-described electronic game apparatus, a player may play in accordance with a method such as that described hereinbelow. First, for example, a plurality of data of scales of well-known songs are stored in memory 55. When a player plays these previously stored songs, a sign 500a (See FIG. 34) indicating the location of a light receiving portion 504 that should have the light shut out to generate the sound of the scale thereof is displayed on the display portion 500 based on the control of the computing portion 54. Therefore, by touching a transparent cap 504c and covering a light receiving portion 504 in accordance with the sign 500a thereof, a player can readily generate a predetermined scale and play the song.

Furthermore, a predetermined character 500b (for example, a fictional person or animal) as shown in FIG. 34 can also be displayed on the display portion 500. The data of this character 500b is stored in memory 55, and is displayed on the display portion 500 on the basis of the control of the computing portion 54. Then, in the display portion 500, a screen in which the character 500b appears to be pointing is displayed in the location of the light receiving portion 504 indicated by the above-mentioned sign 500a. Therefore, the player feels just like he is playing the scale in accordance with the directions of the character 500b.

When a player plays a song by generating a scale in accordance with the directions of a character 500b in this manner, the appearance of the character 500b can be set so as to change in accordance with the song being played. That is, a musical performance game program of contents like those described hereinbelow, for example, is stored in memory 55, and executed by the computing portion 54.

Degree of difficulty of performance rankings are set in advance in stages for a plurality of scales stored in the above-mentioned memory 55. Then, a player initially plays a song with a low degree of difficulty ranking, and when he is able to play that song in accordance with the directions of the character 500b, he advances to playing the next ranked song. At this time, the appearance of the character 500b changes each time the ranking of the song to be played increases. For example, the character 500b grows in accordance with the improved performance of the player (each time the ranking of the song to be performed increases). Then, the appearance of the growing character 500b appears on the display portion 500 only when a song of the rank thereof can be performed without error.

Further, the electronic game apparatus can be set up so that when a player plays a scale that has been stored in memory 55 beforehand, the character 500b grows as the player becomes able to play the scale thereof in accordance with the directions of the character 500b.

Furthermore, the electronic game apparatus can also be set up so that as a player practices a certain scale, the character 500b grows in accordance with more frequent playing, that is, to the extent that the time spent playing the scale thereof increases. Furthermore, the playing of a scale in accordance with the electronic game apparatus 5 of this aspect is achieved by a player adjusting the amount of light, which a light receiving portion 504 receives. Therefore, the growth (changing) of the character 500b in accordance with the playing of a scale as described above is the appearance of the character 500b growing (changing) in accordance with the amount of received light of a light receiving portion 504, which is adjusted by the player. An example of a variation of an electronic game apparatus equipped with a musical performance game program, in which a character 500b grows in accordance with the manner of execution of scale playing like this, is described hereinbelow.

Figure 38:
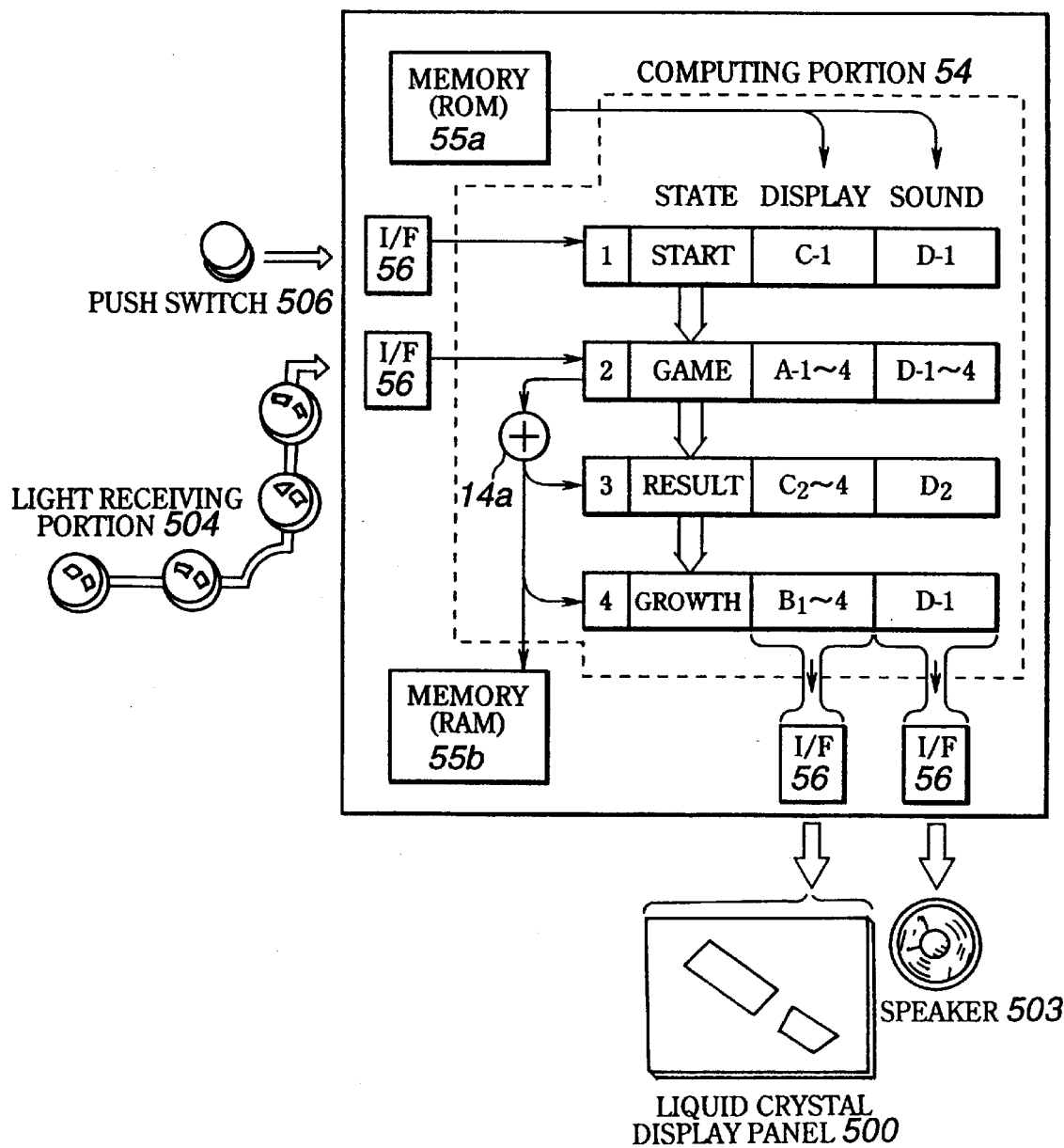
FIG. 38 is a block diagram showing the functions of a microcomputer built into the electronic game apparatus of the fifth aspect.

This electronic game apparatus has, for example, an external appearance similar to that of FIG. 34, and it enables a player to start a musical performance game by pressing a push switch 506 (See FIG. 38) not shown in FIG. 34. FIG. 38 is a block diagram of the functions of a microcomputer, which is built into this electronic game apparatus. The microcomputer has a computing portion (MPU) 54, and memory 55a and 55b, and the computing portion 54 is connected via an interface circuit (I/F) 56 to a push switch 506, a light receiving portion 504, a liquid crystal display panel 500, and a speaker 503, respectively.

Figure 39:
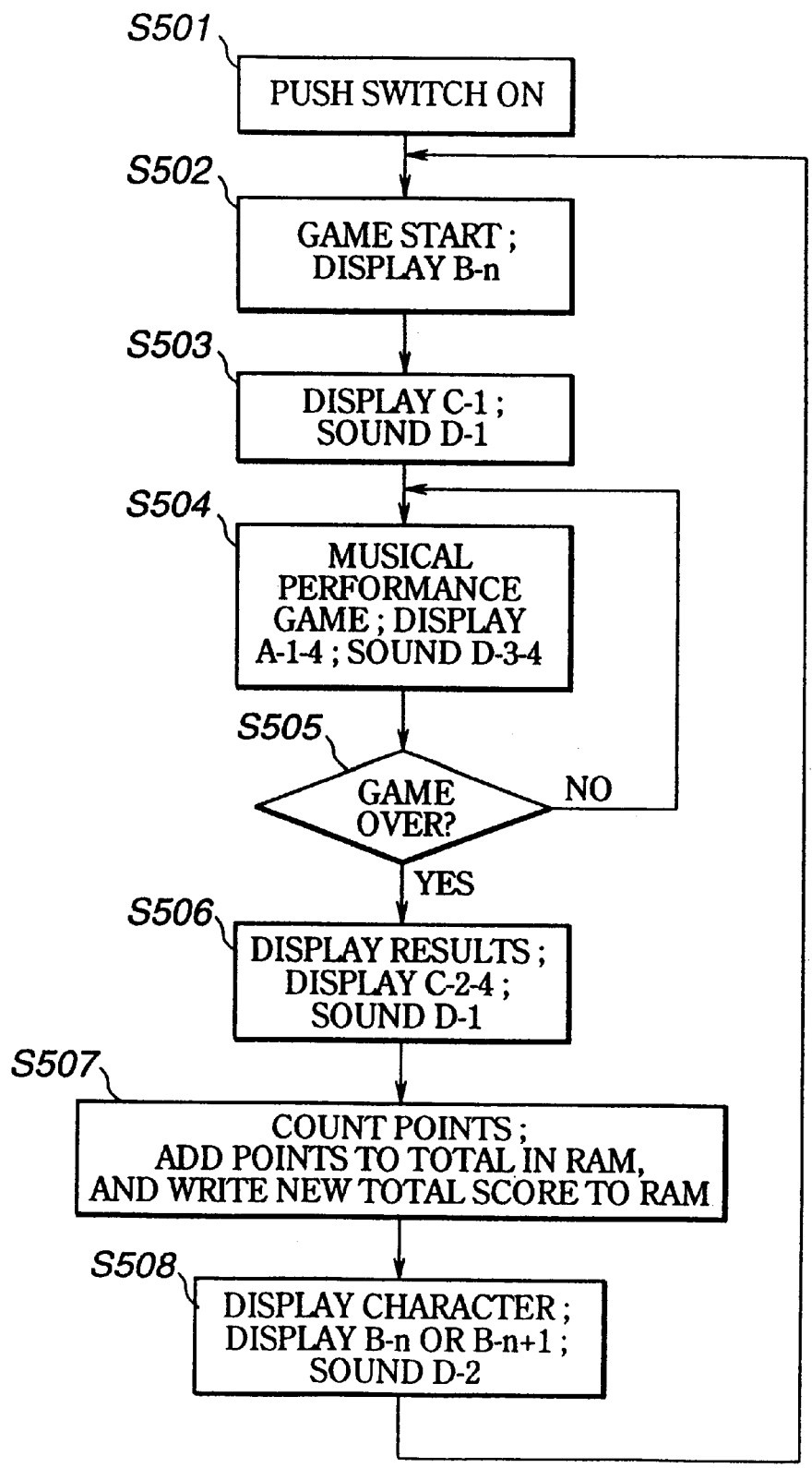
FIG. 39 is an example of a flowchart for a musical game program.
Figure 40:
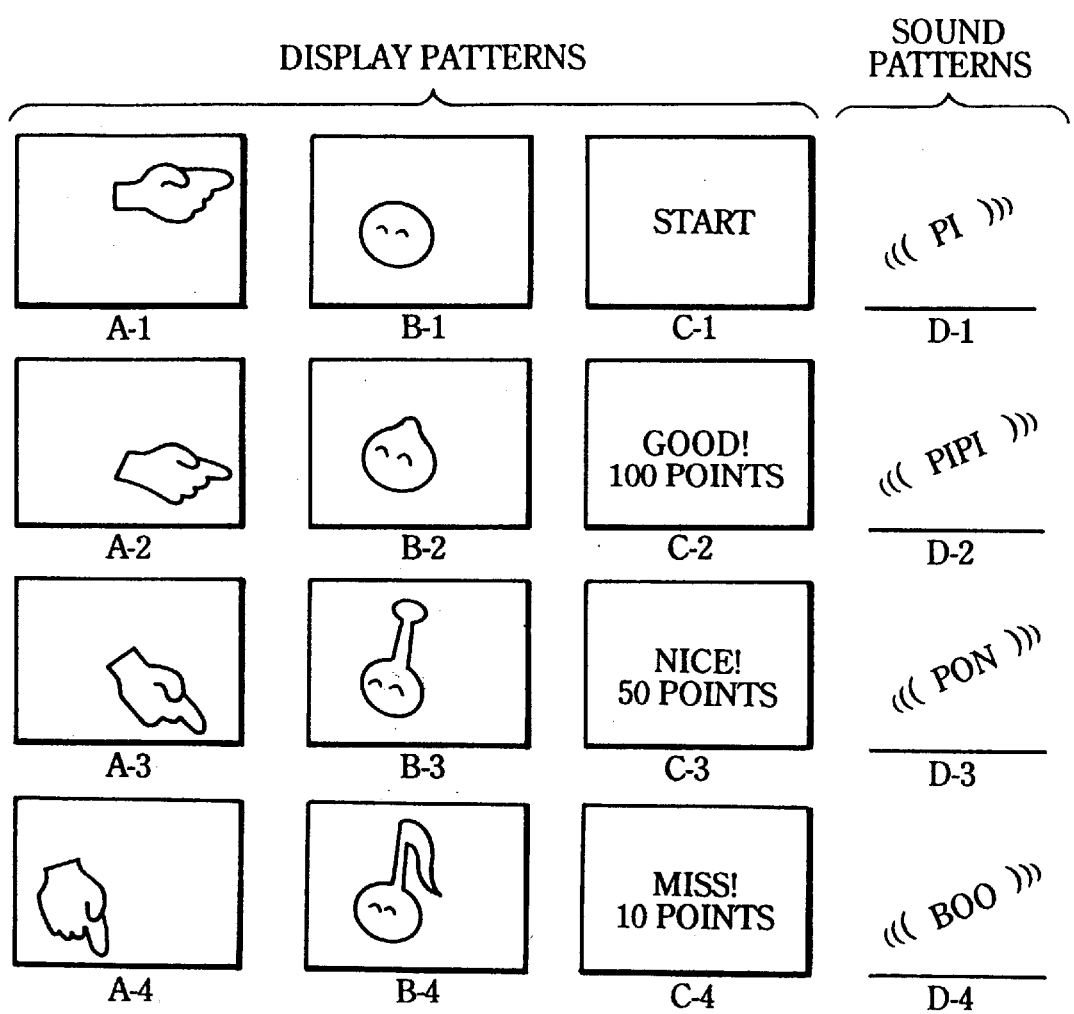
FIG. 40 are examples of display patterns and sound patterns when a musical game is executed in accordance with the musical game program.

Memory 55a is a ROM that stores a musical performance game program described below, and memory 55b is RAM, which stores game results executed in accordance with the program thereof. FIG. 39 is an example of a flowchart of a musical performance game program executed by the computing portion 54. FIG. 40 is examples of display patterns displayed on the liquid crystal display panel 500, and sound patterns outputted from the speaker 503, when the musical performance game is executed in accordance with the program thereof. Display patterns A-1 through A-4 are signs that indicate the location of a light receiving portion 504 that a player is to cover with a finger. Display patterns B-1 through B-4 are modes of a character 500b, which changes in accordance with growth. Display patterns C-1 through C-4 are the contents of screen displays at game start and at game end. Sound patterns D-1 through D-4 are types of sounds outputted in accordance with game execution. Further, display patterns and sound patterns are not limited to the 4 types each shown in FIG. 40, and, for example, even more character modes (B-1 through B-n (where n is an integer of 5 or higher)) can be set as character 500bdisplay patterns. The flowchart of FIG. 39 is described while referring to this FIG. 40.

In FIG. 39, when the push switch 506 is pressed (S501), the musical performance game starts, and one of the character 500b modes of display patterns B-1 through B-4 is displayed on the liquid crystal display panel 500 (S502). For example, when playing the game for the first time, display pattern B-1, which is the initial stage of growth, is displayed. In accordance therewith, a player can confirm the growth stage of a character 500b prior to starting a game.

Thereafter, in S503, display pattern C-1, which signifies game start is displayed on the liquid crystal display panel 500, and the sound of sound pattern D-1, which signals game start, is outputted from the speaker 3.

In S504, when the musical performance game starts, a player covers with a finger a light receiving portion 504 in accordance with directions as per display patterns A-1 through A-4. At this time, when a light receiving portion 504 is covered in accordance with directions of a display pattern from A-1 through A-4, the sound of sound pattern D-3 is outputted to confirm that coverage is in accordance with directions. When a light receiving portion 504 is not covered in accordance with directions of a display pattern from A-1 through A-4, the sound of sound pattern D-4 is outputted to inform the player that a light receiving portion 504 is not being covered in accordance with directions.

When the musical performance game ends in Step S505, the sound of sound pattern D-1 is outputted, and the results of the musical performance game are displayed on the liquid crystal display panel 500 in Step S506. More specifically, the score of one of display patterns C-2 through C-4 is displayed in accordance with the ratio at which a light receiving portion 504 was covered in accordance with directions of display patterns A-1 through A-4 during the musical performance game. For example, when a light receiving portion 504 was covered in accordance with directions 80 percent or more of the time, high score display pattern C-2 is displayed, and when this ratio is greater than 50 percent but less than 80 percent, low score display pattern C-3 is displayed, and when this ratio is less than 50 percent, even lower score display pattern C-4 is displayed. Then in S507, the points obtained are counted. More specifically, the points obtained in accordance with the musical performance game are added by the adding portion 54a of FIG. 38 to the total score of up until the game prior, which were stored in RAM 55b, and the added new total score is written to RAM 55b. Furthermore, in S508, a character 500b, which accords with the update total score thereof, is displayed. More specifically, when the total score reaches a predetermined number or higher, the sound of sound pattern D-4 is outputted, and a character 500b, which has grown to the next stage, is displayed on the liquid crystal display panel 500. For example, when the character 500b of Step S502 of prior to the start of a musical performance game is display pattern B-1, and in accordance with points obtained as a result of this musical performance game, the updated total score reaches the predetermined number, the character of display pattern B-2 is displayed. When the updated new total score does not reach the predetermined number, the B-1 character is displayed once again.

Then, if this musical performance game is repeated, and the score added by the adding portion 54a attains the plurality of predetermined numbers set in accordance with the growth stage of the character 500b, the character 500b changes to the growth stage corresponding to the predetermined number thereof, and is displayed as any of display patterns B-1 through B-4 on the liquid crystal display panel 500.

By setting up the electronic game apparatus so that the appearance of the character 500b changes (grows) in this manner as the player improves, to change (grow) the character 500b, the player has to practice the assigned song diligently. Therefore, when a child is taught music as part of the child's artistic training, for example, if this game apparatus is used, the child will be able to develop an unflagging appreciation of music while playing a game.

Further, in addition to scales that have been stored beforehand, naturally, it is also possible to play scales on one's own. A function for scoring the free performances thereof can be provided to the electronic game apparatus at this time. Furthermore, by adding a function, that automatically plays a pre-stored scale, a metronome function, and even a clock function, it is possible to constitute the electronic game apparatus as an alarm clock function, which outputs a stored scale from the speaker 503 at a predetermined time.

In accordance with the present invention, since an electronic game apparatus comprises legs and can be set down, and comprises an operating portion in a location that is easy to operate, it is possible to provide an electronic game apparatus that is easier to operate than a conventional product.

In accordance with the present invention, since the body is a model of a game character, it is possible to provide an electronic game apparatus with an appealing shape.

In accordance with the present invention, since game processing time is provided as an operative period and an inoperative period, and since operation changes processing in accordance with the period in which it is implemented, it is possible to provide an electronic game apparatus, which requires consistent operation timing, and which is more difficult and more interesting to operate than a conventional product.

In accordance with the present invention, since an electronic game apparatus comprises an operating portion that is modeled on a disk jockey-operated turntable, and a constitution that enables the generation of a sound, it is possible to provide an electronic game apparatus, which combines an element of a musical instrument-with an element of a game.

In accordance with the present invention, since an electronic game apparatus provide an operative period and an inoperative period corresponding to a rhythm pattern, and since operation changes processing in accordance with the period in which it is implemented, it is possible to provide an electronic game apparatus, which requires a constant sense of rhythm to operate, and which enables the provision of game-playing heretofore not found in a conventional product.

In accordance with the present invention, since an electronic game apparatus comprises means for applying a vibration to the body in line with the appearance of a predetermined character, it is possible to provide an electronic game apparatus capable of alerting a player to an operation time using a vibration.

In accordance with the present invention, since a electronic game apparatus is constituted to enable the increase and decrease via a subordinate game of a value, which determines the action of a character that moves in accordance with an operation, it is possible to provide a novel, interesting electronic game apparatus heretofore not found in a conventional product.

In accordance with the present invention, it is possible to provide an electronic game apparatus, which enables the realization of a game in which a different display appears in accordance with fate, such as a written oracle or fortune-telling.

In accordance with the present invention, there is provided a novel electronic game apparatus, which generates a sound in accordance with the amount of light that a light receiving device detects. And it becomes possible to adjust the intensity of the sound to be generated by adjusting the amount of light which a light receiving device receives.

Further, a player can readily play a song in accordance with the fact that a predetermined sign displayed on the display portion indicates the location of a light receiving portion, which should be covered to generate a sound of a predetermined scale. Furthermore, since the present invention is constituted to enable the displaying of a predetermined character on the display portion, and the changing of the appearance of the character in accordance with the proficiency of a player, a musical performance can be accomplished in a game-playing mood, and it is possible to furnish a player with an incentive to practice performing, and to hasten the performance proficiency of a player.

What is claimed is:

1. An electronic game apparatus, which is constituted to enable an operating state of an operating portion, which includes a rotating member, in accordance with a player to be reflected in a movement of a game character, the electronic game apparatus being constituted to provide an operative period, which treats an operating state of said operating portion as being operative, and an inoperative period, which treats an operating state of said operating portion as being inoperative, and to make it possible to change game processing when a player operates said operating portion during said operative period, and when a player operates said operating portion during said inoperative period, wherein said operative period and said non-operative period are determined based on rotation of said rotating member and non-rotation of said rotating member, respectively; wherein said rotating member has a record-turntable-imitating external shape, said rotating member is capable of rotating on a rotation axis.

2. The electronic game apparatus according to claim 1, wherein a predetermined icon is displayed in near synchronization with a specific rhythm pattern, the display timing of this icon is treated as said operative period, a period other than the display timing of this icon is treated as said inoperative period, and the processing of a game is changed in accordance with whether or not the operation of said operating portion by a player is done in time with said rhythm pattern.

3. The electronic game apparatus according to claim 2, further having a mode changing switch and a sound switch as said operating portion, and comprising a sound generating circuit, which is constituted to enable the generation of a predetermined sound, and a timer circuit, which outputs clock data, and being constituted so as to be able to switch to any of game processing, rhythm processing or clock processing in accordance with the operation of said mode changing switch, and when said rhythm processing is selected, a sound corresponding to the operation of said sound switch is generated by said sound generating circuit, and when said clock processing is selected, clock data is displayed on said display panel based on said timer circuit-outputting clock data.

4. An electronic game apparatus, which is constituted to enable an operating state of an operating portion, which includes a rotating member, in accordance with a player to be reflected in a movement of a game character, this electronic game apparatus comprising:

reading means for reading an operating state of said rotating member of said operating portion;

operative-inoperative deciding means for determining an operative period, which treats an operating state of said operating portion as being operative, and inoperative period, which treats an operating state of said operating portion as being inoperative;

determining means for determining whether a time when an operating state of said operating portion was read by said reading means falls under said operative period, or falls under said inoperative period; and game processing means for changing the processing of a game in accordance with whether or not an operating state of said operating portion was read by said determining means in said operative period, or was read in said inoperative period; wherein said rotating member has a record-turntable-imitating external shape, said rotating member is capable of rotating on a rotation axis.

5. An electronic game apparatus, which is constituted to enable an operating state of an operating portion in accordance with a player to be reflected in a movement of a game character, this electronic game apparatus comprising:

an operating portion, which includes a rotatable member and outputs operating signals in accordance with an operation of a player; and a control circuit, which executes a predetermined game program on the basis of said operating signals, and said control circuit determines an operative period based on rotation of said rotatable member, which treats an operating signal, which was inputted from said operating portion during processing of said game program, as operative, and an inoperative period based on non-rotation of said rotatable member, which treats an operating signal, which was inputted from said operating portion during processing of said game program, as inoperative, and changes game processing in accordance with whether said operating signal was inputted in said operative period, or was inputted in said inoperative period; wherein said rotatable member has a record-turntable-imitating external shape, said rotatable member is capable of rotating on a rotation axis.

6. The electronic game apparatus according to claim 5, wherein said control circuit, in feedback loop processing in accordance with said game processing, determines whether a loop thereof is treated as said operative period, or is treated as said inoperative period.

7. A portable game apparatus comprising:

a body having an asymmetrical shape and a size that is capable of being gripped in one hand of a user, the body including:
a display panel;
a plurality of operating switches;
a rotating dial; and
a control device that processes a game by reading an operating state of said plurality of operating switches and said rotating dial, and by executing a program;
wherein
said rotating dial has a record-turntable-imitating external shape, said rotating dial is capable of rotating on a rotation axis.

8. The portable game apparatus according to claim 7, further comprising a speaker arranged to generate sound in accordance with said operating state of said rotating dial.

9. The portable game apparatus according to claim 7, wherein said rotating dial includes spring means for providing a biasing force to said rotating dial whether said rotating dial is rotated to the left or rotated to the right from an original position.

10. A portable game apparatus comprising:

a body having an asymmetrical shape and a size that is capable of being gripped in one hand of a user, the body including:
a display panel;
a plurality of operating switches;
a rotating dial; and
a control device that processes a game by reading an operating state of said plurality of operating switches and said rotating dial, and by executing a program;
wherein
said display panel is divided into a character indicator which displays a predetermined character based on bitmap data and an icon indicator that displays an icon for designating operation of said plurality of operating switches; and
said rotating dial has a record-turntable-imitating external shape, said rotating dial is capable of rotating on a rotation axis.

11. The portable game apparatus according to claim 10, wherein said icon indicator designates an operation of said rotating dial, allots a different sound to one of said operating switches in accordance with said game processing state in said control device, and transmits the sound via a speaker in said body.

* * * * *